United States Patent
Kang

(10) Patent No.: US 12,439,700 B2
(45) Date of Patent: Oct. 7, 2025

(54) INTEGRATED CIRCUIT INCLUDING STANDARD CELL AND METHOD OF DESIGNING THE SAME

(71) Applicant: SAMSUNG ELECTRONICS CO., LTD., Suwon-si (KR)

(72) Inventor: Byounggon Kang, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 641 days.

(21) Appl. No.: 17/722,004

(22) Filed: Apr. 15, 2022

(65) Prior Publication Data

US 2022/0367439 A1 Nov. 17, 2022

(30) Foreign Application Priority Data

May 11, 2021 (KR) .................. 10-2021-0060901

(51) Int. Cl.
H01L 27/02 (2006.01)
H10D 89/10 (2025.01)
G06F 30/392 (2020.01)

(52) U.S. Cl.
CPC ........... *H10D 89/10* (2025.01); *G06F 30/392* (2020.01)

(58) Field of Classification Search
CPC ......... H01L 27/0207; H01L 21/823871; H01L 23/528; H01L 27/092; H01L 2027/11866; H01L 23/5386; H01L 29/4238; G06F 30/392; G06F 30/394
USPC ...................................................... 257/207
See application file for complete search history.

(56) References Cited

U.S. PATENT DOCUMENTS

| | | | |
|---|---|---|---|
| 10,037,401 B2 | 7/2018 | Song et al. | |
| 10,141,335 B2 | 11/2018 | Becker et al. | |
| 10,339,249 B2 | 7/2019 | Lefferts | |
| 10,424,574 B2 | 9/2019 | Chu et al. | |
| 10,790,273 B2 | 9/2020 | Do | |
| 10,811,357 B2 | 10/2020 | Lee et al. | |
| 10,903,239 B2 | 1/2021 | Chang et al. | |
| 2019/0181130 A1* | 6/2019 | Do | G06F 30/394 |
| 2020/0357823 A1 | 11/2020 | Kumar et al. | |
| 2020/0395298 A1 | 12/2020 | Peng et al. | |
| 2021/0305232 A1* | 9/2021 | You | H01L 29/42392 |
| 2022/0262786 A1* | 8/2022 | Yu | H01L 27/0207 |
| 2022/0382949 A1* | 12/2022 | Lee | H10D 89/10 |

FOREIGN PATENT DOCUMENTS

| | | | |
|---|---|---|---|
| KR | 10 2018 0114812 A | 10/2018 | |
| KR | 10 2019 0067682 A | 6/2019 | |
| KR | 10-2021-0067839 A | 6/2021 | |

OTHER PUBLICATIONS

Communication dated Jun. 30, 2025 issued by the Korean Intellectual Property Office in Korean Patent Application No. 10-2021-0060901.

* cited by examiner

*Primary Examiner* — Tong-Ho Kim
(74) *Attorney, Agent, or Firm* — Sughrue Mion, PLLC

(57) ABSTRACT

An integrated circuit includes plural standard cells performing a same function. The standard cells include a first standard cell and a second standard cell, and the first standard cell and the second standard cell are to the same as each other in terms of an arrangement of internal conductive patterns and are different from each other in terms of a position of a via formed over a gate line through which an input signal is input.

20 Claims, 26 Drawing Sheets

INTEGRATED CIRCUIT INCLUDING STANDARD CELL AND METHOD OF DESIGNING THE SAME

CROSS-REFERENCE TO RELATED APPLICATION

This application is based on and claims priority under 35 U.S.C. § 119 to Korean Patent Application No. 10-2021-0060901, filed on May 11, 2021, in the Korean Intellectual Property Office, the disclosure of which is incorporated by reference herein in its entirety.

BACKGROUND

The inventive concept relates to an integrated circuit, and more particularly, to an integrated circuit including a standard cell and a method of designing the integrated circuit.

An integrated circuit may be designed based on standard cells. Particularly, a layout of an integrated circuit may be generated by arranging standard cells according to data defining the integrated circuit and routing the arranged standard cells. As a semiconductor manufacturing process is refined, the size of patterns in a standard cell may decrease and the size of the standard cell may also decrease. As the gate length of a device and the pitch between gate lines in an integrated circuit have decreased continuously, the density of lines for connecting semiconductor devices has increased.

SUMMARY

It is an aspect to provide an integrated circuit in which the degree of congestion of routing for interconnecting standard cells is reduced by reducing the density of upper lines formed in a metal layer.

According to an aspect of an embodiment, there is provided an integrated circuit comprising a plurality of standard cells performing a same function, wherein the plurality of standard cells include a first standard cell and a second standard cell, and the first standard cell and the second standard cell are the same as each other in terms of an arrangement of internal conductive patterns and are different from each other in terms of a position of a via formed over a gate line through which an input signal is input.

According to another aspect of an embodiment, there is provided an integrated circuit comprising a plurality of standard cells; a first metal layer and a second metal layer formed over the first metal layer, the first metal layer and the second metal layer being for interconnecting the plurality of standard cells, wherein patterns of the first metal layer extend in a first horizontal direction, patterns of the second metal layer extend in a second horizontal direction, and at least one standard cell among the plurality of standard cells includes a gate line, which extends in the second horizontal direction and through which an input signal is received, as an input pin.

According to another aspect of the inventive concept, there is provided an integrated circuit comprising a plurality of standard cells; and a first metal layer and a second metal layer formed over the first metal layer, the first metal layer and the second metal layer being for interconnecting the plurality of standard cells, wherein patterns of the first metal layer extend in a first horizontal direction, patterns of the second metal layer extend in a second horizontal direction, and a first standard cell among the plurality of standard cells includes a first gate contact, which contacts a first gate line, which extends in the second horizontal direction and through which an input signal is received, as an input pin.

According to another aspect of an embodiment, there is provided a method of designing an integrated circuit with reference to a standard cell library in which standard cells performing a same function and having different layouts are defined, the method comprising arranging a plurality of standard cells and generating an interconnection between the plurality of standard cells; and based on a degree of congestion of an interconnection of a target standard cell among the plurality of standard cells, rearranging a standard cell of the plurality of standard cells by changing the target standard cell into another standard cell of the plurality of standard cells, and regenerating an interconnection with the rearranged standard cell, wherein the rearranged standard cell performs a same function as the target standard cell, and an input pin through which an input signal is input is formed as one of a gate line and a gate contact formed over the gate line.

BRIEF DESCRIPTION OF THE DRAWINGS

Embodiments will be more clearly understood from the following detailed description taken in conjunction with the accompanying drawings in which:

FIG. 7B is a cross-sectional view taken along line Y2-Y2' of FIG. 7A;

DETAILED DESCRIPTION

Hereinafter, various embodiments of the inventive concept will be described with reference to the accompanying drawings. For convenience of illustration, the accompanying drawings may not be to scale and components may be illustrated in an exaggerated or reduced manner.

Figure 1:
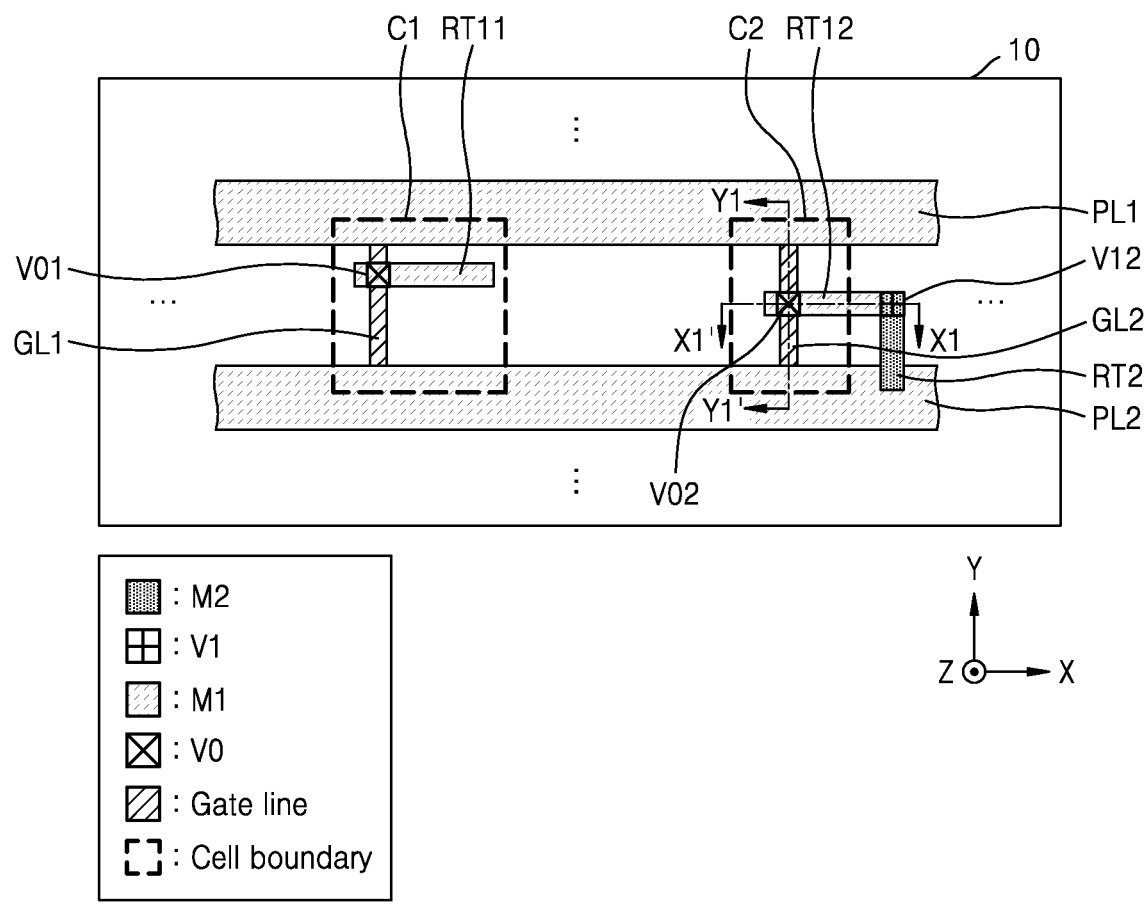
FIG. 1 is a diagram for describing an integrated circuit according to an embodiment.

FIG. 1 is a diagram for describing an integrated circuit according to an embodiment. FIG. 1 is a plan view illustrating a portion of an integrated circuit 10 constituting one chip or one functional block on a plane including a X axis and a Y axis. Herein, an X-axis direction and a Y-axis direction may be respectively referred to as a first horizontal direction and a second horizontal direction, and a Z-axis direction may be referred to as a vertical direction. A plane including the X and Y axes may be referred to as a horizontal plane, a component arranged in the +Z-axis direction in comparison to another component may be referred to as being over the other component, and a component arranged in the −Z-axis direction in comparison to another component may be referred to as being under the other component.

The integrated circuit 10 may include a plurality of standard cells. A standard cell may be a unit of a layout included in an integrated circuit, may be designed to perform a predefined function, and also may be referred to as a cell. The integrated circuit 10 may include a plurality of various standard cells, and the standard cells may be aligned and arranged along a plurality of rows.

A plurality of standard cells may be repeatedly used in an integrated circuit design. The standard cells may be predesigned according to manufacturing technology and stored in a standard cell library, and an integrated circuit may be designed by arranging and interconnecting the standard cells stored in the standard cell library according to a design rule.

For example, the standard cells may include various basic circuits such as inverters, AND gates, NAND gates, OR gates, XOR gates, and/or NOR gates frequently used in digital circuit designs of electronic apparatuses, such as central processing unit (CPU), graphics processing unit (GPU), and system-on-chip (SOC) designs, etc. Alternatively, for example, the standard cells may include other circuits such as flip-flops and latches frequently used in circuit blocks.

The standard cells may include a filler cell. The filler cell may be arranged adjacent to a functional cell to provide routing of signals provided to or output from the functional cell. Also, the filler cell may be a cell used to fill the space remaining after functional cells are arranged.

The standard cells may include an active region and a gate line. The active region and the gate line included in the standard cell may form a transistor. In an embodiment, the gate line may include a work function metal-containing layer and a gap-fill metal layer. For example, the work function metal-containing layer may include at least one metal among Ti, W, Ru, Nb, Mo, Hf, Ni, Co, Pt, Yb, Tb, Dy, Er, and Pd, and the gap-fill metal layer may include a W layer or an Al layer. In an embodiment, the gate line may include a stack structure of TiAlC/TiN/W, a stack structure of TiN/TaN/TiAlC/TiN/W, or a stack structure of TiN/TaN/TiN/TiAlC/TiN/W.

The integrated circuit 10 may include metal layers in which lines for interconnecting the standard cells are formed. For example, a second metal layer M2 may be formed over a first metal layer M1. In an embodiment, the first metal layer M1 may include patterns extending in the X-axis direction, and the second metal layer M2 may include patterns extending in the Y-axis direction (unidirection). Also, in some embodiments, a third metal layer may be further formed over the second metal layer M2.

The patterns formed in each of the metal layers may include a metal, a conductive metal nitride, a metal silicide, or any combination thereof. In the accompanying drawings, only some layers may be illustrated for convenience of illustration, and in order to indicate the connection between a pattern of the metal layer and a lower pattern, a via may be shown although located under the pattern of the metal layer.

A first power line PL1 and a second power line PL2 for supplying a voltage to each of the standard cells may be formed at the boundary of each of the plurality of rows. The first power line PL1 may be arranged to provide a first supply voltage (e.g., a power voltage VDD) to each of the standard cells, and the second power line PL2 may be arranged to provide a second supply voltage (e.g., a ground voltage VSS) to each of the standard cells. For example, the first power line PL1 and the second power line PL2 may be formed as a conductive pattern extending in the X-axis direction and may be alternately arranged in the Y-axis direction. FIG. 1 illustrates that each of the first power line PL1 and the second power line PL2 is formed as a pattern of the first metal layer M1; however, the integrated circuit 10 is not limited thereto and, in some embodiments, each of the first power line PL1 and the second power line PL2 may be formed as a pattern of the second metal layer M2 or may be formed inside an isolation trench formed in a substrate.

Referring to FIG. 1, the integrated circuit 10 may include a first standard cell C1 and a second standard cell C2 that perform the same function and have the same arrangement of internal conductive patterns. For example, the first standard cell C1 and the second standard cell C2 may be inverters, NAND gates, or AND-OR-Invert (AOI) gates.

Each of the first standard cell C1 and the second standard cell C2 may include a gate line GL1 or GL2 extending in the Y-axis direction. In an embodiment, in the first standard cell C1, a gate line GL1 or a gate contact formed to contact the gate line GL1 may be formed as an input pin through which an input signal is received from the outside. In an embodiment, in the second standard cell C2, a gate line GL2 or a gate contact formed to contact the gate line GL2 may be formed as an input pin through which an input signal is received from the outside.

Referring to the left hand side of FIG. 1, a first routing line RT11 for interconnecting with another standard cell, and a first via V01 formed between the first routing line RT11 and the gate line GL1 may be connected to the first standard cell C1. The input pin of the first standard cell C1 may not be formed in the first or second metal layer M1 or M2 but may be formed as the gate line GL1 or the gate contact, and accordingly, the first standard cell C1 may receive an input signal through the first routing line RT11 and the first via V01 electrically connected to the gate line GL1. Thus, the first via V01 and the first routing line RT11 configured to transmit an input signal to the first standard cell C1 may be freely formed at any position overlapping the gate line GL1. Alternatively, the first via V01 and the first routing line RT11 configured to transmit the input signal to the first standard cell C1 may be freely formed at any position overlapping the gate contact in the Z-axis direction.

Referring to the right hand side of FIG. 1, a first routing line RT12 and a second routing line RT2 for interconnecting with another standard cell, a first via V02 (see FIG. 2) formed between the first routing line RT12 and the gate line GL2, and a second via V12 formed between the first routing line RT12 and the second routing line RT2 may be connected to the second standard cell C2. The input pin of the second standard cell C2 may not be formed in the first or second metal layer M1 or M2 but may be formed as the gate line GL2 or the gate contact, and accordingly, the second standard cell C2 may receive an input signal through the first routing line RT12, the second routing line RT2, the first via V02, and the second via V12 electrically connected to the gate line GL2. Thus, the first via V02 and the first routing line RT12 configured to transmit an input signal to the second standard cell C2 may be freely formed at any position overlapping the gate line GL2. Alternatively, the second via V02 and the second routing line RT12 configured to transmit the input signal to the second standard cell C2 may be freely formed at any position overlapping the gate contact in the Z-axis direction. Thus, in the first standard cell C1 and the second standard cell C2, the degree of freedom of the arrangement of the routing lines formed to interconnect with another standard cell of the integrated circuit 10 may be increased and the degree of congestion of the routing lines may be reduced, and accordingly, the power loss due to RC characteristics of the routing line may be reduced and thus the performance and reliability of the integrated circuit 10 may be improved.

The arrangement of the first via V01 and the first routing line RT11 may be determined according to another standard cell adjacent to the first standard cell C1, and the arrangement of the first via V02 and the first routing line RT12 may be determined according to another standard cell adjacent to the second standard cell C2. Thus, although the first standard cell C1 and the second standard cell C2 of the integrated circuit 10 may perform the same function and have the same internal conductive patterns formed therein, the positions of the first via V01 or V02 configured to transmit an input signal to each of the first standard cell C1 and the second standard cell C2 may be different from each other.

Figure 2:
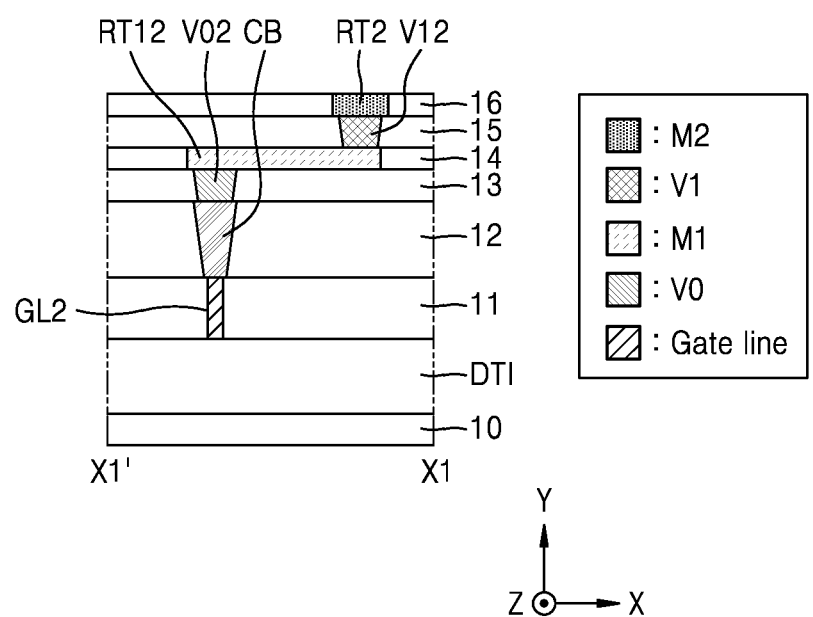
FIGS. 2, 3A, and 3B are cross-sectional views illustrating examples of a standard cell structure of an integrated circuit according to an embodiment.
Figure 3A:
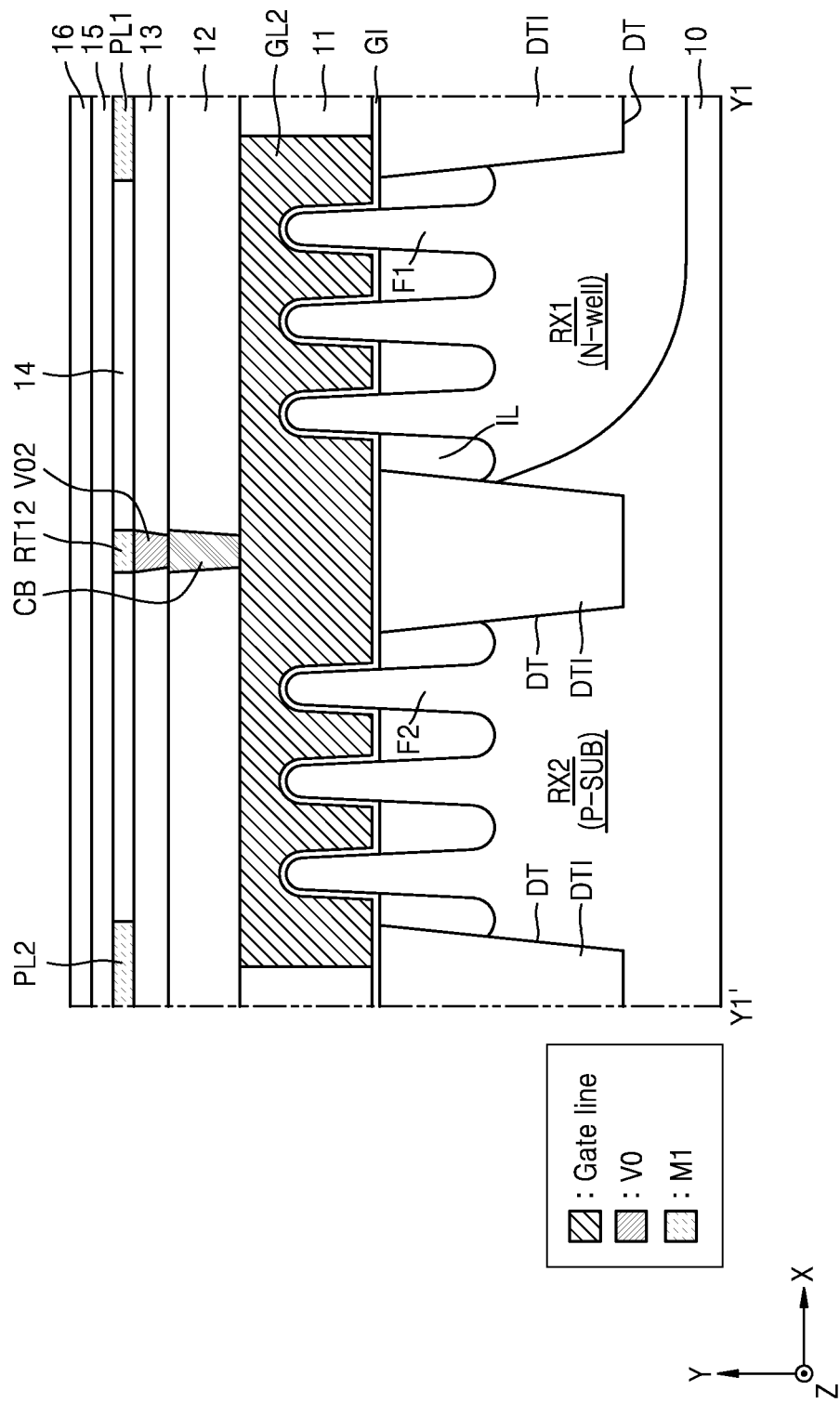
Figure 3B:
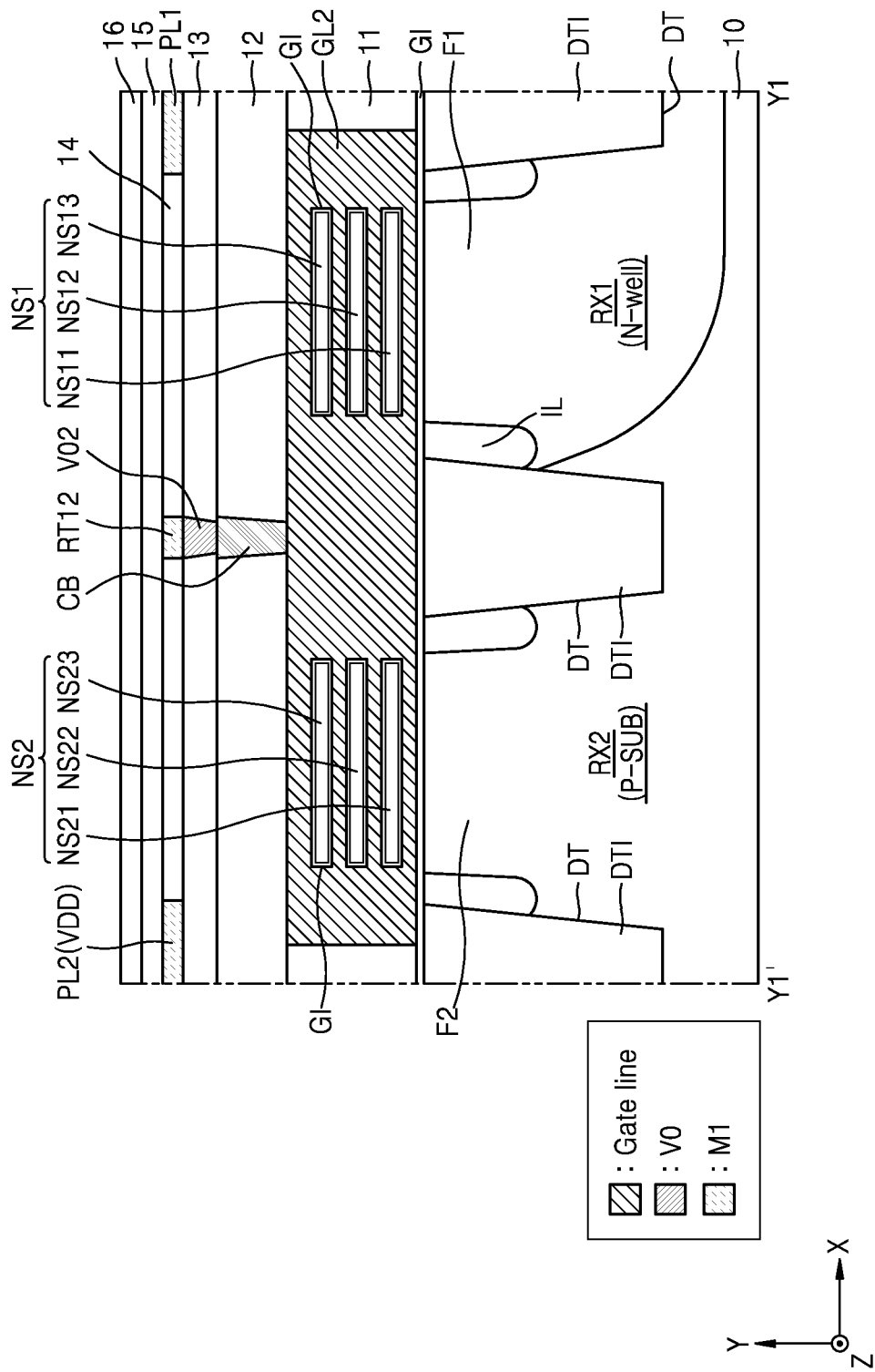

FIGS. 2, 3A, and 3B are cross-sectional views illustrating examples of a standard cell structure of an integrated circuit according to an embodiment. FIG. 2 is a cross-sectional view taken along line X1-X1' of FIG. 1, and FIGS. 3A and 3B are cross-sectional views taken along line Y1-Y1' of FIG. 1. Although not illustrated in FIGS. 2, 3A, and 3B, a gate spacer may be formed on a side surface of a gate line, and a barrier layer may be formed on a surface of a contact and/or a via.

FIG. 3A illustrates an example in which a plurality of fins are formed in an active region, and FIG. 3B illustrates an example in which a nanosheet is formed in an active region. However, the standard cell included in the integrated circuit is not limited to those illustrated in FIGS. 3A and 3B. For example, in some embodiments, in the standard cell, a gate-all-around (GAA) FET may be formed in which a nanowire formed over an active region is surrounded by a gate line, and a vertical GAA FET may be formed in which a plurality of nanowires are vertically stacked over an active region and the plurality of nanowires are surrounded by a gate line. For example, in some embodiments, a multi-bridge channel (MBC) FET in which a plurality of nanosheets are stacked over an active region and a gate line surrounds the plurality of nanosheets may be formed in the standard cell. Also, for example, in some embodiments, a negative capacitance (NC) FET may be formed in the active region. In addition to examples of the transistors described above, according to various embodiments, various transistors (e.g., complementary FET (CFET), negative capacitance FET (NCFET), carbon nanotube (CNT) FET, bipolar junction transistors, and other three-dimensional transistors) may be formed in the gate line and the active region.

Referring to FIGS. 2 and 3A, a substrate 10 may include a semiconductor such as silicon (Si) or germanium (Ge), or a Group III-V compound such as GaAs, AlGaAs, InAs, InGaAs, InSb, GaSb, InGaSb, InP, GaP, InGaP, InN, GaN, or InGaN. In an embodiment, the substrate 10 may be a silicon-on-insulator (SOI) substrate or a germanium-on-insulator (GOI) substrate. In an embodiment, the substrate 10 may be doped with P-type dopants.

A first active region RX1 and a second active region RX2 may be formed in the substrate 10. In an embodiment, the second active region RX2 may be formed in the substrate 10 doped with P-type dopants (P-SUB), and the first active region RX1 may be formed in an N-well formed in the substrate 10. The first active region RX1 may form the gate line GL2 and a P-type transistor, and the second active region RX2 may form the gate line GL2 and an N-type transistor.

An isolation trench DT may be formed between the first active region RX1 and the second active region RX2. The isolation trench DT may be filled with an insulating material (e.g., oxide) to form a device isolating layer DTI. The first active region RX1 and the second active region RX2 may be isolated from each other by the device isolating layer DTI. Also, under the first power line PL1 and the second power line PL2, an isolation trench DT may be formed and a device isolating layer DTI may be formed.

A plurality of first fins F1 and a plurality of second fins F2 may extend in parallel to each other in the X-axis direction. A device insulating layer IL (e.g., oxide) may be formed between the plurality of first fins F1 and the plurality of second fins F2. In the first active region RX1 and the second active region RX2, the plurality of first fins F1 and the plurality of second fins F2 may protrude in a fin shape over the device insulating layer IL. FIG. 3A illustrates that three first fins F1 and three second fins F2 are formed; however, embodiments are not limited thereto and in various embodiments the number of fins formed in the first active region RX1 and the second active region RX2 may be variously modified.

A gate insulating layer GI and the gate line GL2 may be formed to extend in the Y-axis direction. The gate insulating layer GI and the gate line GL2 may cover the upper surface and both sidewalls of each of the plurality of first fins F1, the upper surface and both sidewalls of each of the plurality of second fins F2, the upper surface of the device insulating layer IL, and the upper surface of the device isolating layer DTI.

A first interlayer insulating layer 11, a second interlayer insulating layer 12, a third interlayer insulating layer 13, a fourth interlayer insulating layer 14, a fifth interlayer insulating layer 15, and a sixth interlayer insulating layer 16 may be formed over the plurality of first fins F1 and the plurality of second fins F2. An active contact and an active via may be formed through the first interlayer insulating layer 11 to connect a source/drain region to a pattern of the first metal layer M1.

A gate contact CB may be connected to the gate line GL2 through the second interlayer insulating layer 12, and the gate via V02 may connect the gate contact CB to the first routing line RT12 through the third interlayer insulating layer 13. The first routing line RT12 may be formed as a pattern of the first metal layer M1, and the gate via V02 may be formed as a first via V0 (see FIG. 1) electrically connected under the first metal layer M1. Accordingly, the first routing line RT12 may be electrically connected to the gate line GL2 through the gate via V02 and the gate contact CB.

As shown in FIG. 2, the second via V12 connecting the first routing line RT12 to the second routing line RT2 may be formed through the fifth interlayer insulating layer 15 as a second via V1 (see FIG. 1). The second routing line RT2 may be formed as a pattern of the second metal layer M2 that is an upper layer over the first metal layer M1.

Referring to FIG. 3B, in an embodiment, a nanosheet that is an active region may be formed over each of the first active region RX1 and the second active region RX2. A first nanosheet stack NS1 may be formed over the first active region RX1, and a second nanosheet stack NS2 may be formed over the second active region RX2. Each of the first nanosheet stack NS1 and the second nanosheet stack NS2 may extend in the X-axis direction.

The first nanosheet stack NS1 and the second nanosheet stack NS2 may function as a channel of a transistor. For example, the first nanosheet stack NS1 may be doped with N-type dopants and may form a P-type transistor. On the other hand, the second nanosheet stack NS2 may be doped with P-type dopants and may form an N-type transistor. In an embodiment, the first nanosheet stack NS1 and the second nanosheet stack NS2 may include Si, Ge, or SiGe. In an embodiment, the first nanosheet stack NS1 and the second nanosheet stack NS2 may include InGaAs, InAs, GaSb, InSb, or any combination thereof.

The first nanosheet stack NS1 and the second nanosheet stack NS2 may respectively include a plurality of nanosheets NS11 to NS13 and NS21 to NS23 overlapping each other in the vertical direction (Z-axis direction) over the upper surfaces of a first fin F1 and a second fin F2. In the example illustrated in FIG. 3B, a case where each of the first nanosheet stack NS1 and the second nanosheet stack NS2 includes three nanosheets is illustrated; however, embodiments are not limited thereto. For example, in some embodiments, each of the first nanosheet stack NS1 and the second nanosheet stack NS2 may include at least two nanosheets, and the number of nanosheets is not particularly limited.

The gate line GL2 may surround each of the plurality of nanosheets NS11 to NS13 and NS21 to NS23 while covering the first nanosheet stack NS1 and the second nanosheet stack NS2 over the first fin F1 and the second fin F2. The plurality of nanosheets NS11 to NS13 and NS21 to NS23 may have a Gate-All-Around (GAA) structure surrounded by the gate line GL2. The gate insulating layer GI may be arranged between the first nanosheet stack NS1 and the second nanosheet stack NS2 and the gate line GL2.

Figure 4:
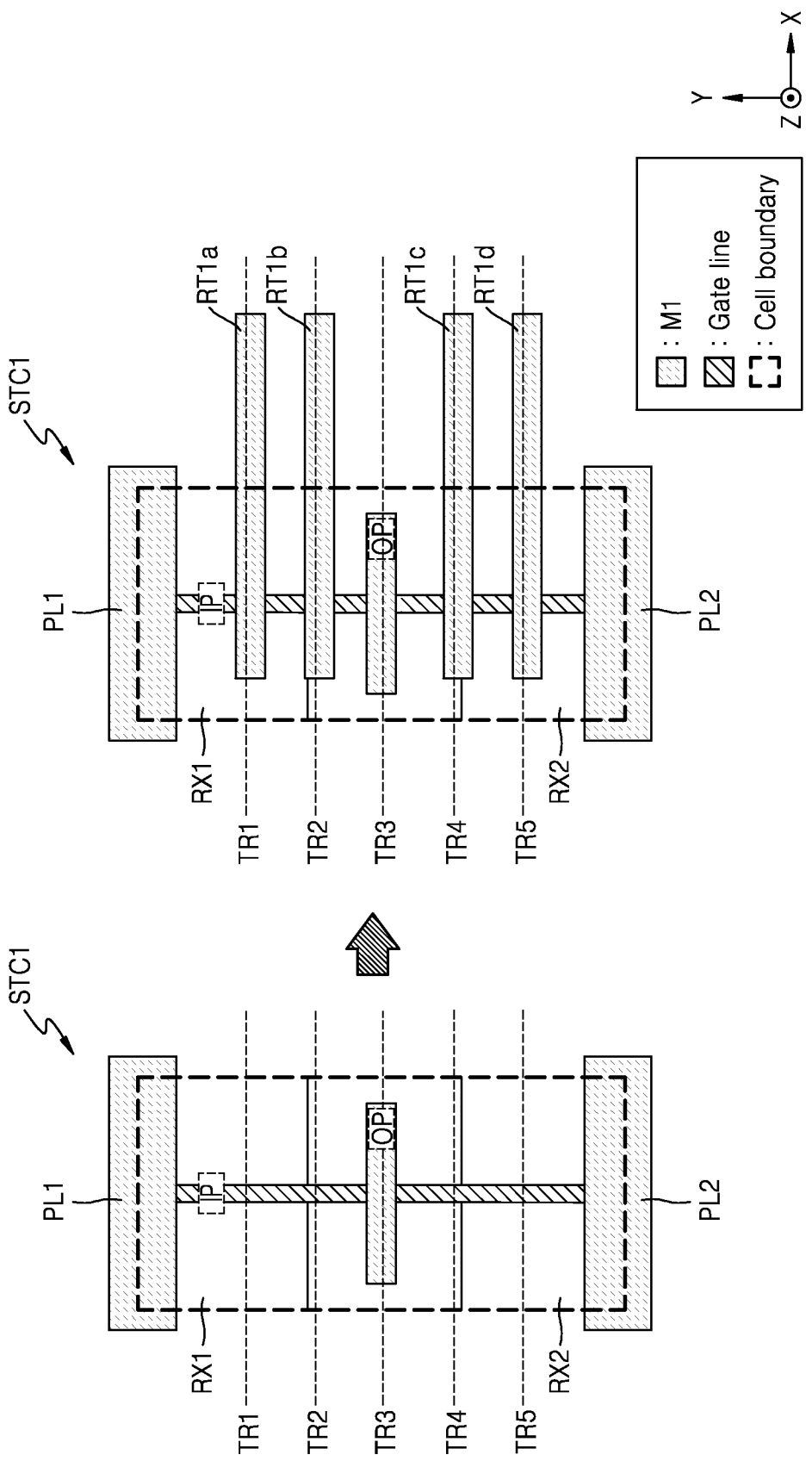
FIGS. 4 to 6 are plan views for describing standard cells of various layouts included in an integrated circuit according to an embodiment.
Figure 5:
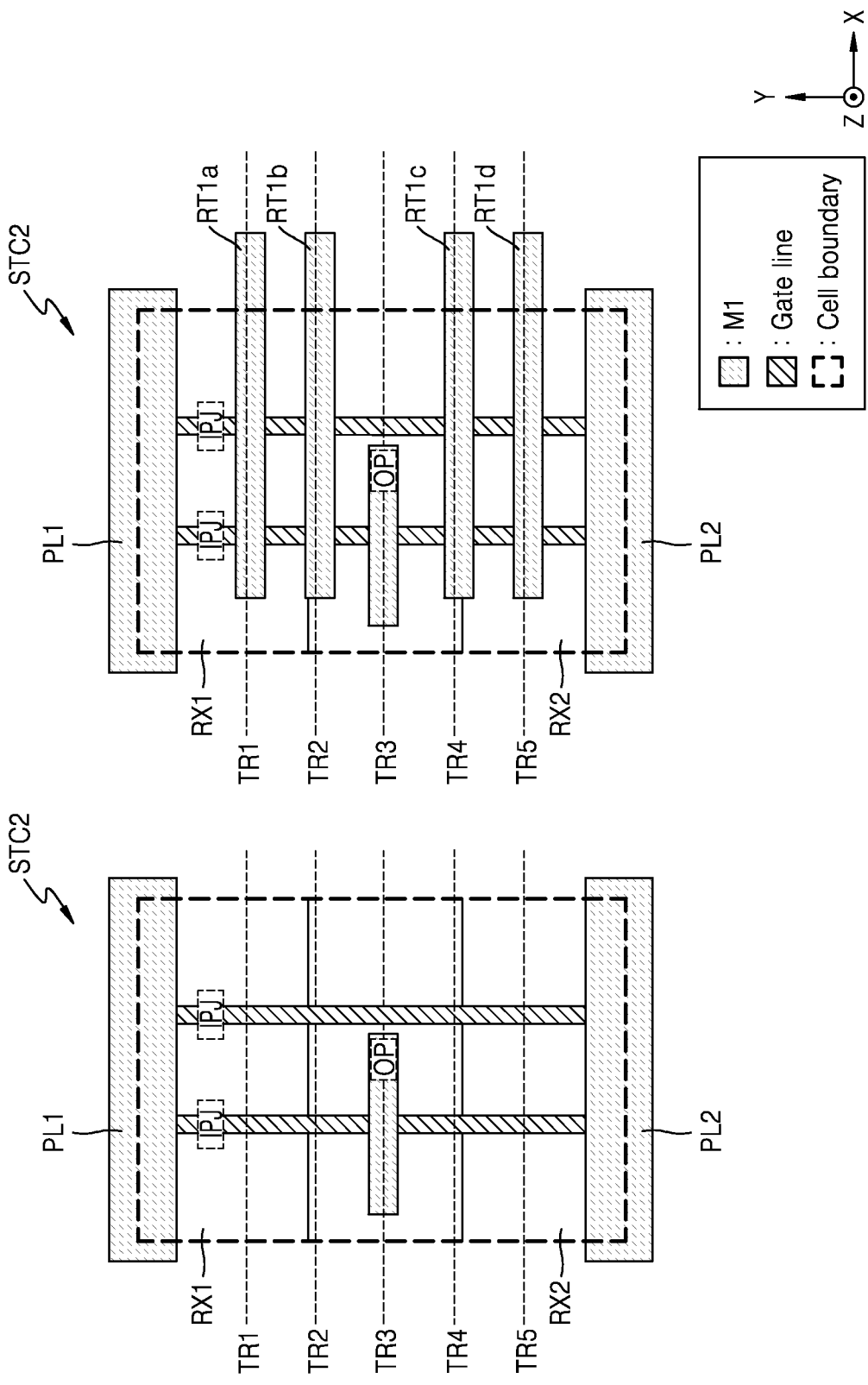
Figure 6:
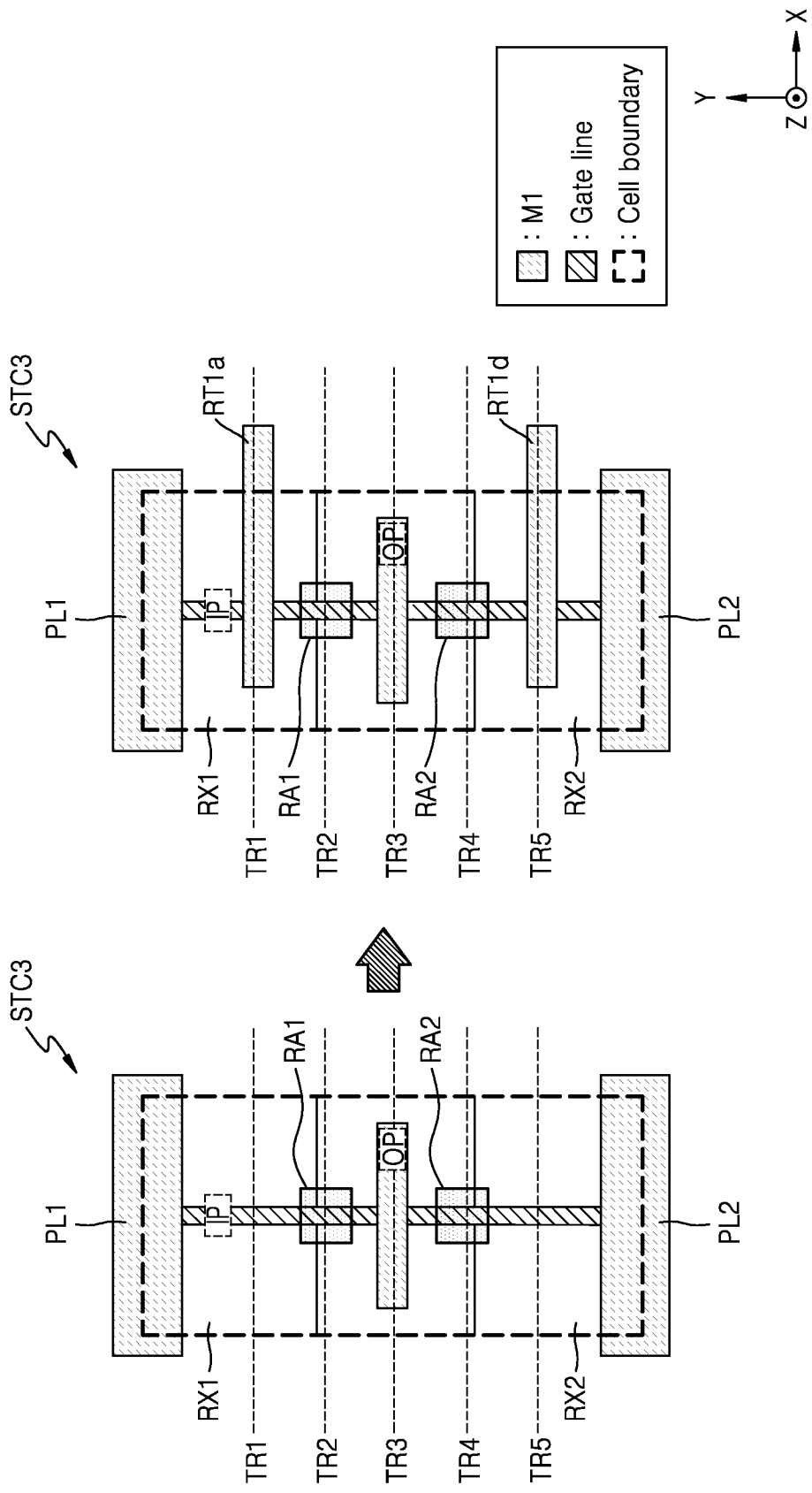

FIGS. 4 to 6 are plan views for describing standard cells of various layouts included in an integrated circuit according to an embodiment.

Standard cells STC1, standard cells STC2, and standard cells STC3 illustrated in FIGS. 4 to 6, respectively, may be an example of the first standard cell C1 and the second standard cell C2 illustrated in FIG. 1 and may perform the same function as the first standard cell C1 and the second standard cell C2. The standard cells STC1 to STC3 may be defined by a cell boundary, may include a first active region RX1 and a second active region RX2 extending in the X-axis direction, and may include a gate line extending in the Y-axis direction.

Referring to FIG. 4, the standard cell STC1 may include an input pin IP through which an input signal is received from the outside, and may include an output pin OP arranged to output an output signal to the outside. In an embodiment, the standard cell STC1 may include an input pin IP of a gate line and may include an output pin OP formed as a pattern of the first metal layer M1. In data about the standard cell STC1 stored in the standard cell library, a gate line of the standard cell STC1 may be represented as a label indicating the input pin IP.

A plurality of tracks in which patterns of the first metal layer M1 are arranged, for example, a first track TR1, a second track TR2, a third track TR3, a fourth track TR4, and a fifth track TR5, may be formed in the standard cell STC1. A conductive pattern extending in the X-axis direction may be formed in the first to fifth tracks TR1 to TR5.

For example, when the standard cell STC1 includes an output pin OP arranged in the third track TR3, at least one routing line of a routing line RT1a of the first track TR1, a routing line RT1b of the second track TR2, a routing line RT1c of the fourth track TR4, and a routing line RT1d of the fifth track TR5 may be selected and formed to transmit an input signal to the input pin IP of the standard cell STC1. A gate contact and a gate via may be formed under the selected routing line to be connected to the gate line that is the input pin IP. Thus, compared with a standard cell of the related art in which an input pin is formed in the first metal layer M1, in the case of the standard cell STC1 according to the embodiment illustrated in FIG. 4, because the standard cell STC1 includes a gate line that is an input pin IP, the degree of freedom of routing line formation may be increased and the degree of congestion of routing lines may be reduced. In other words, since a routing line may be selected and formed on one or more of the first, second, fourth or fifth tracks T1, T2, T4, or T5 along the gate line, the degree of freedom of routing line formation may be increased and the degree of congestion of the routing lines may be reduced.

Referring to FIG. 5, the standard cell STC2 may include a plurality of input pins IPJ through which the same input signal is received from the outside, and may include an output pin OP arranged to output an output signal to the outside. In an embodiment, the standard cell STC2 may include input pins IPJ of gate lines and may include an output pin OP formed as a pattern of the first metal layer M1. In data about the standard cell STC2 stored in the standard cell library, a plurality of gate lines of the standard cell STC2 may be represented as a label indicating a plurality of input pins IPJ through which the same input signal is received, and the plurality of input pins IPJ may be electrically connected to each other by connecting the same routing line to the plurality of input pins IPJ in a routing operation (e.g., operation S20 of FIG. 16) of generating an interconnection between the standard cell STC2 and another standard cell with reference to the standard cell library.

For example, when the standard cell STC2 includes an output pin OP arranged in the third track TR3, at least one routing line of a routing line RT1a of the first track TR1, a routing line RT1b of the second track TR2, a routing line RT1c of the fourth track TR4, and a routing line RT1d of the fifth track TR5 may be selected and formed to transmit an input signal to the input pins IPJ of the standard cell STC2. A plurality of gate lines that are a plurality of input pins IPJ may be connected together to the selected at least one routing line; that is, gate contacts and gate vias may be formed under the selected routing line to be respectively connected to the gate lines that are the input pins IPJ.

Referring to FIG. 6, the standard cell STC3 may include an input pin IP through which an input signal is received from the outside and which is formed as a gate line, and may include an output pin OP arranged to output an output signal to the outside and formed as a pattern of the first metal layer M1. A no-routing region RA1 or RA2 defined to prohibit formation of an interconnection may be formed over the gate line that is the input pin IP of the standard cell STC3. In a routing operation (e.g., operation S20 of FIG. 16) of generating an interconnection between the standard cell STC3 and another standard cell with reference to the standard cell library, a routing line may be prohibited from being formed over the no-routing region RA1 or RA2, and a gate contact and a gate via for connecting the routing line to the gate line may not be formed.

For example, a first no-routing region RA1 and a second no-routing region RA2 may be formed in the standard cell STC3. In a case where the first no-routing region RA1 is arranged in the second track TR2, the second no-routing region RA2 is arranged in the fourth track TR4, and the standard cell STC3 includes an output pin OP arranged in the third track TR3, at least one routing line of a routing line RT1a of the first track TR1 and a routing line RT1d of the fifth track TR5 may be formed to transmit an input signal to the input pin IP of the standard cell STC3. Gate contacts and gate vias may be formed under the selected routing line to be connected to the gate line that is the input pin IP. In other words, in some embodiments, the no-routing region may be used in order to limit the tracks on which the routing lines may be selected and formed for a given standard cell.

It has been described above that the first no-routing region RA1 and the second no-routing region RA2 are formed in the standard cell STC3; however, embodiments are not limited thereto and according to various embodiments the position where the no-routing region is formed may be freely modified. Compared with the standard cell STC1 of FIG. 4, in the case of the standard cell STC3 of FIG. 6, because the no-routing region RA1 or RA2 is formed, the degree of freedom of routing line formation may be relatively reduced, but because a range of change in the timing characteristics of the standard cell STC3 is reduced, it may be easy to design the timing characteristics of the standard cell STC3 to correspond to a target value.

Figure 7A:
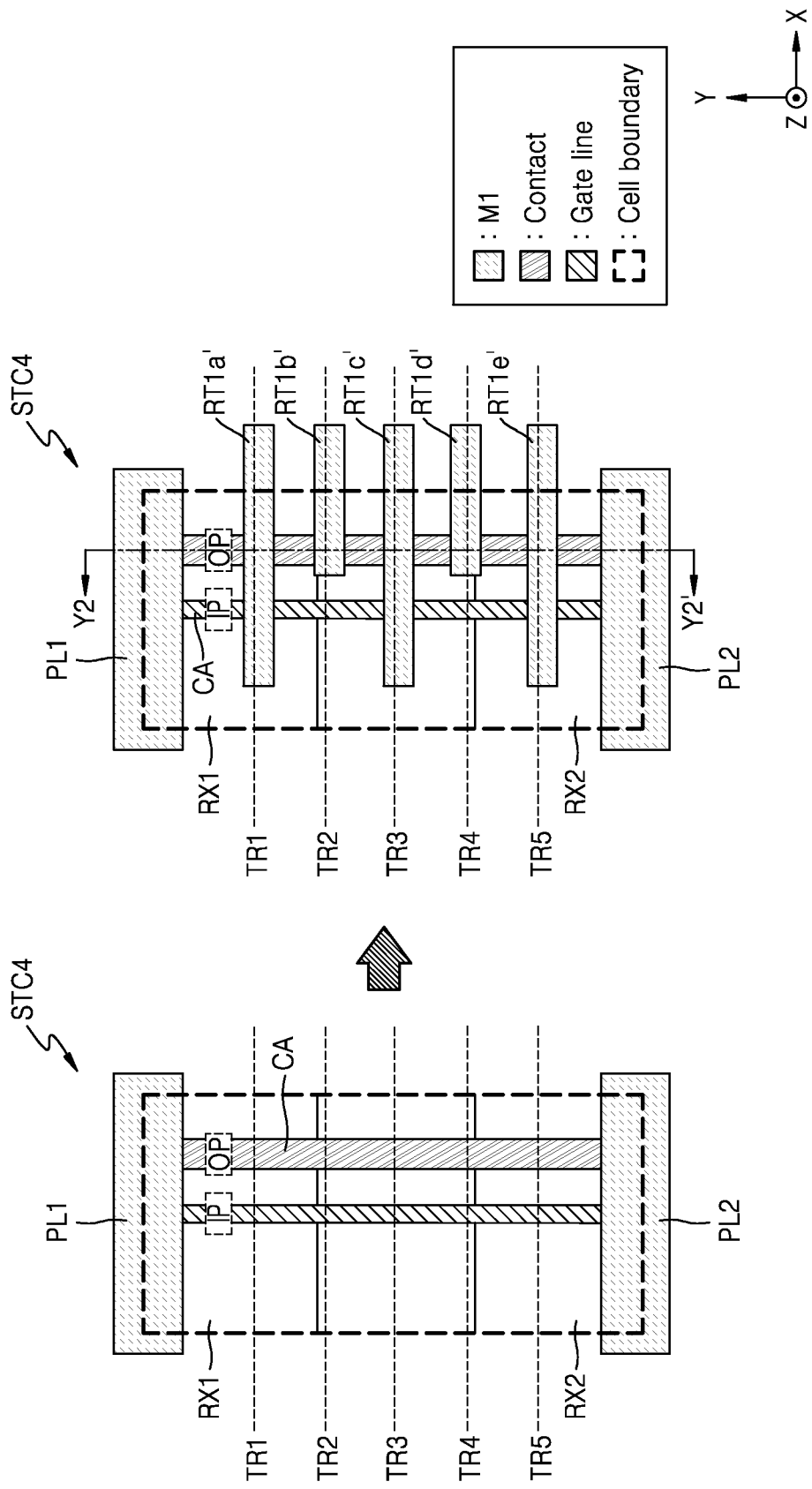
FIGS. 7A, 7B and 8 are plan views for describing standard cells of various layouts included in an integrated circuit according to an embodiment, where
Figure 7B:
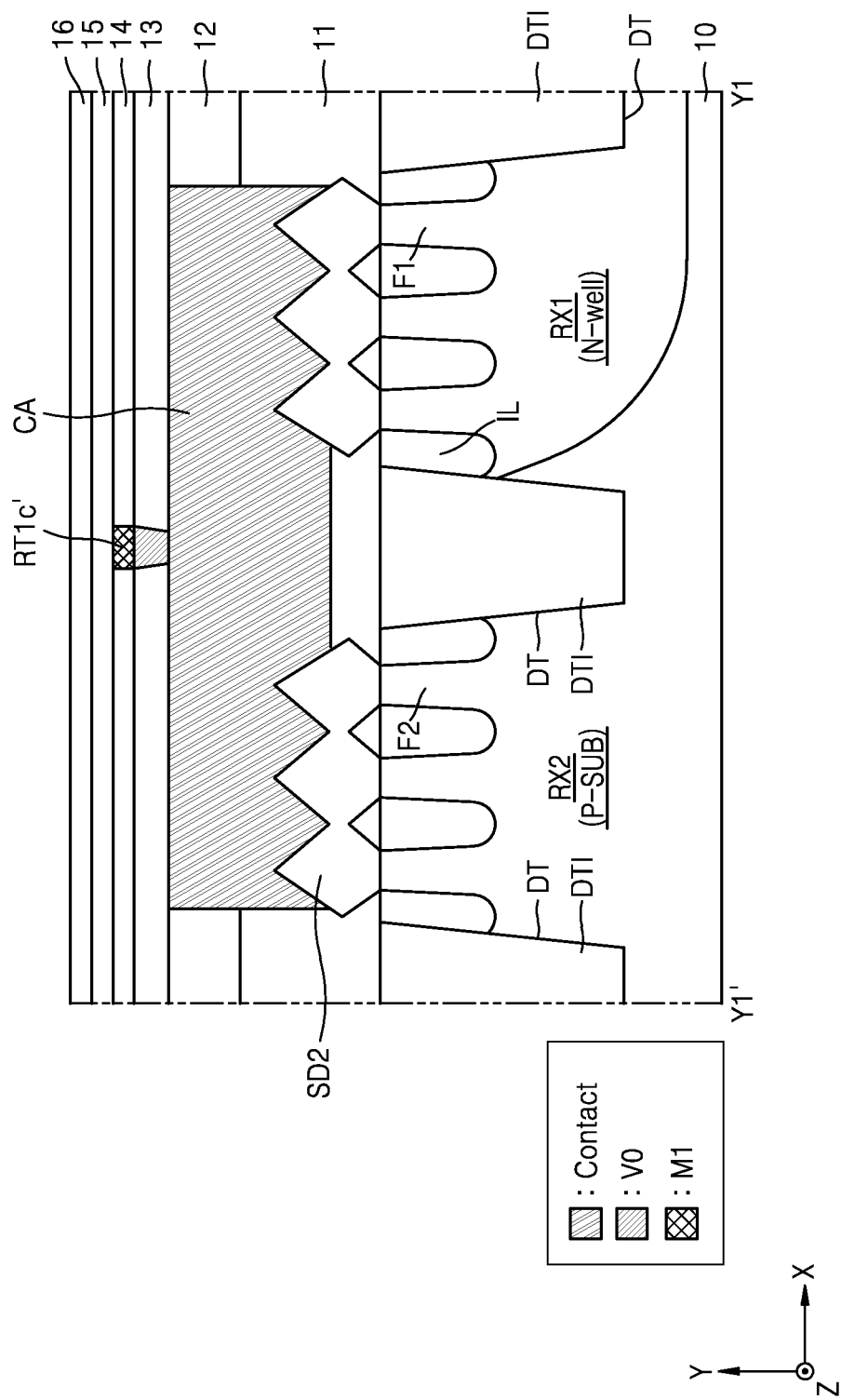
Figure 8:
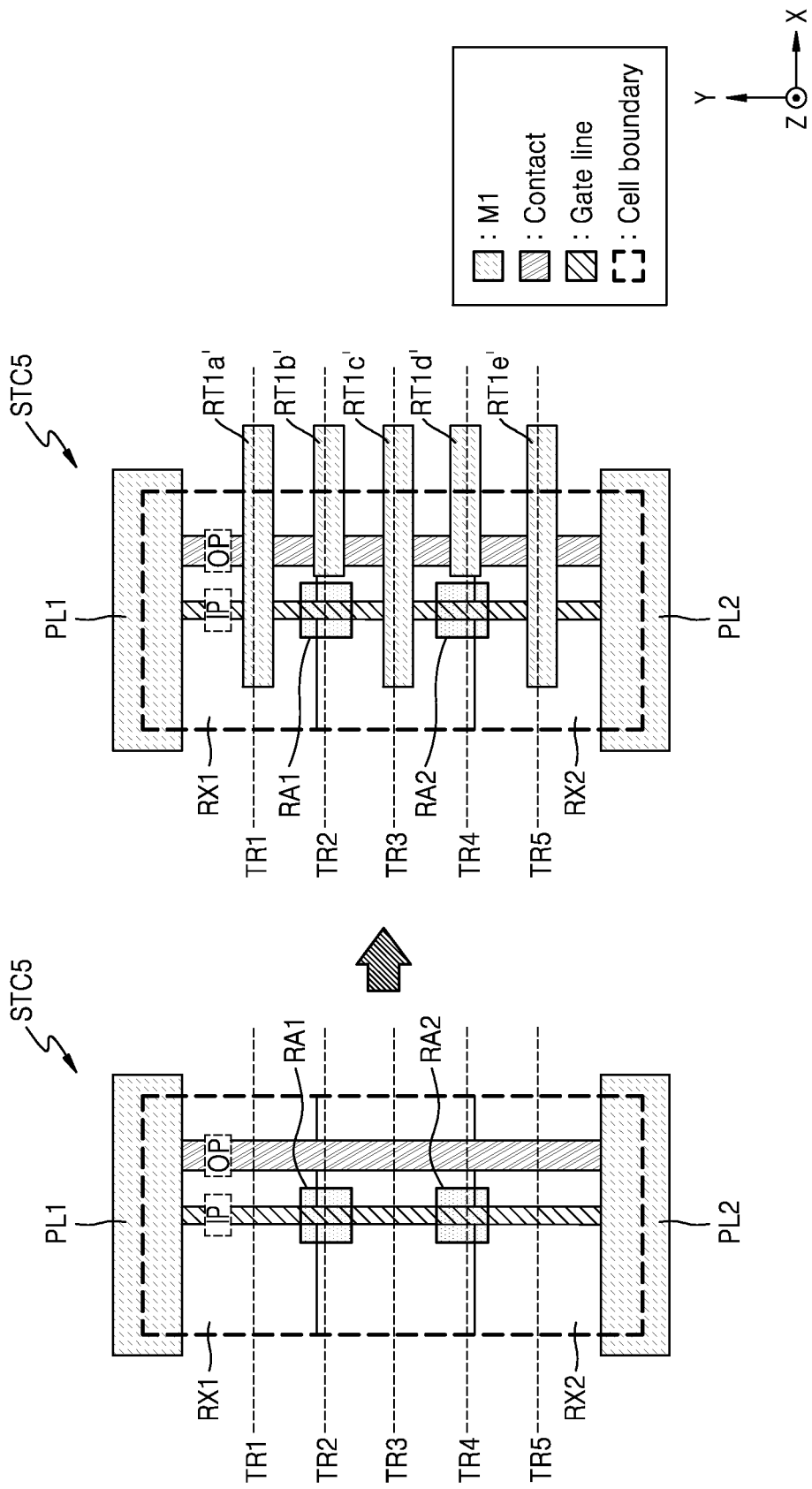

FIGS. 7A, 7B and 8 are plan views for describing standard cells of various layouts included in an integrated circuit according to an embodiment. FIG. 7B is a cross-sectional view taken along line Y2-Y2' of FIG. 7A. Standard cells STC4 and standard cells STC5 illustrated in FIGS. 7A and 8, respectively, may be an example of the first standard cell C1 and the second standard cell C2 illustrated in FIG. 1 and may perform the same function. The standard cells STC4 and STC5 may be defined by a cell boundary, may include a first active region RX1 and a second active region RX2 extending in the X-axis direction, and may include a gate line extending in the Y-axis direction. In FIG. 7B, redundant descriptions of the same reference numerals as those in FIGS. 2 and 3A will be omitted for conciseness.

Referring to FIG. 7A, the standard cell STC4 may include an input pin IP through which an input signal is received from the outside, and may include an output pin OP arranged to output an output signal to the outside. In an embodiment, the standard cell STC4 may include an input pin IP of a gate line and may include an output pin OP of an active contact CA. In data about the standard cell STC4 stored in the standard cell library, a gate line of the standard cell STC4 may be represented as a label indicating the input pin IP, and an active contact CA of the standard cell STC4 may be represented as a label indicating the output pin OP.

A plurality of tracks in which patterns of the first metal layer M1 are arranged, for example, a first track TR1, a second track TR2, a third track TR3, a fourth track TR4, and a fifth track TR5, may be formed in the standard cell STC4. A routing line connected to the active contact CA that is the output pin OP may be formed in at least one of the first to fifth tracks TR1 to TR5, and a routing line connected to the gate line that is the input pin IP may be formed in at least one of the remaining tracks of the first to fifth tracks TR1 to TR5. For example, in some embodiments, when the input pin IP and the output pin OP are respectively connected to the routing lines formed in different tracks, two routing lines (i.e., one to be connected to the gate line and one to be connected to the active contact) may be selected among routing lines RT1a' to RT1e' of the first to fifth tracks TR1 to TR5 and a total of 20 different combinations of routing lines/tracks may be selected. A gate contact and a gate via may be formed under the selected routing line for an input signal to be connected to the gate line that is the input pin IP, and an active via may be formed under the selected routing line for an output signal to be connected to the active contact CA that is the output pin OP.

Referring to FIGS. 7A and 7B, the active contact CA as the output pin OP may be formed to contact at least one of a source/drain region SD1 formed over the first fins F1 of the first active region RX1 and a source/drain regions SD2 formed over the second fins F2 of the second active region RX2. The active contact CA may contact the source/drain region SD1 formed in the first active region RX1 and the source/drain region SD2 formed in the second active region RX2 through the first interlayer insulating layer 11 and the second interlayer insulating layer 12.

A routing line for electrically connecting the standard cell STC4 to another standard cell, for example, a routing line RT1c' of the first metal layer M1 arranged in the third track TR3, may be connected to the active contact CA that is the output pin OP. In order to connect the routing line RT1c' to the active contact CA, a first via V0 as an active via may be formed through the third interlayer insulating layer 13.

Thus, compared with a standard cell of the related art in which an input pin and an output pin are formed in the first metal layer M1, in the case of the standard cell STC4 according to the embodiment illustrated in FIG. 7B, because the standard cell STC4 includes a gate line that is an input pin IP and an active contact CA that is an output pin OP, the degree of freedom of routing line formation may be increased and the degree of congestion of routing lines may be reduced.

FIG. 7A illustrates that the standard cell STC4 includes one gate line as an input pin IP; however, embodiments are not limited thereto and in some embodiments a plurality of gate lines arranged to receive the same input signal may be included as input pins as described with reference to FIG. 5.

Referring to FIG. 8, the standard cell STC5 may include an input pin IP through which an input signal is received from the outside and which is formed as a gate line, and may include an output pin OP arranged to output an output signal to the outside and formed as an active contact. A no-routing region RA1 or RA2 defined to prohibit formation of an interconnection may be formed over the gate line that is the input pin IP of the standard cell STC5. In a routing operation of interconnecting the standard cell STC5 to another standard cell with reference to the standard cell library, a routing line may not be formed over the no-routing region RA1 or RA2, and a gate contact and a gate via for connecting the routing line to the gate line may not be formed.

For example, a first no-routing region RA1 and a second no-routing region RA2 may be formed in the standard cell STC5. In a case where the first no-routing region RA1 is arranged in the second track TR2 and the second no-routing region RA2 is arranged in the fourth track TR4, at least one routing line of a routing line RT1a' of the first track TR1, a routing line RT1c' of the third track TR3, and a routing line RT1e' of the fifth track TR5 may be selected and formed to transmit an input signal to the input pin IP of the standard cell STC5. Also, at least one routing line of tracks other than the track in which a routing line for transmitting an input signal is formed may be selected and formed to transmit an output signal to the output pin OP of the standard cell STC5.

It has been described above that the first no-routing region RA1 and the second no-routing region RA2 are formed in the standard cell STC5; however, embodiments are not limited thereto and in some embodiments the position where the no-routing region is formed may be freely modified. Compared with the standard cell STC4 of FIG. 7A, in the case of the standard cell STC5 of FIG. 8, because the no-routing region RA1 or RA2 is formed, the degree of freedom of routing line formation may be relatively reduced, but because a range of change in the timing characteristics of the standard cell STC5 is reduced, it may be easy to design the timing characteristics of the standard cell STC5 to correspond to a target value.

FIGS. 9 to 12 are plan views for describing standard cells of various layouts included in an integrated circuit according to an embodiment.

Standard cells STC6a, STC6b, standard cells STC7a, STC7b, standard cells STC8a, STC8b, and standard cells STC9a, and STC9b illustrated in FIGS. 9 to 12 may be an example of the first standard cell C1 and the second standard cell C2 illustrated in FIG. 1 and may perform the same function. The standard cells STC6a, STC6b, the standard cells STC7a, STC7b, the standard cells STC8a, STC8b, and the standard cells STC9a, and STC9b may be defined by a cell boundary, may include a first active region RX1 and a second active region RX2 extending in the X-axis direction, and may include a gate line extending in the Y-axis direction.

Figure 9:
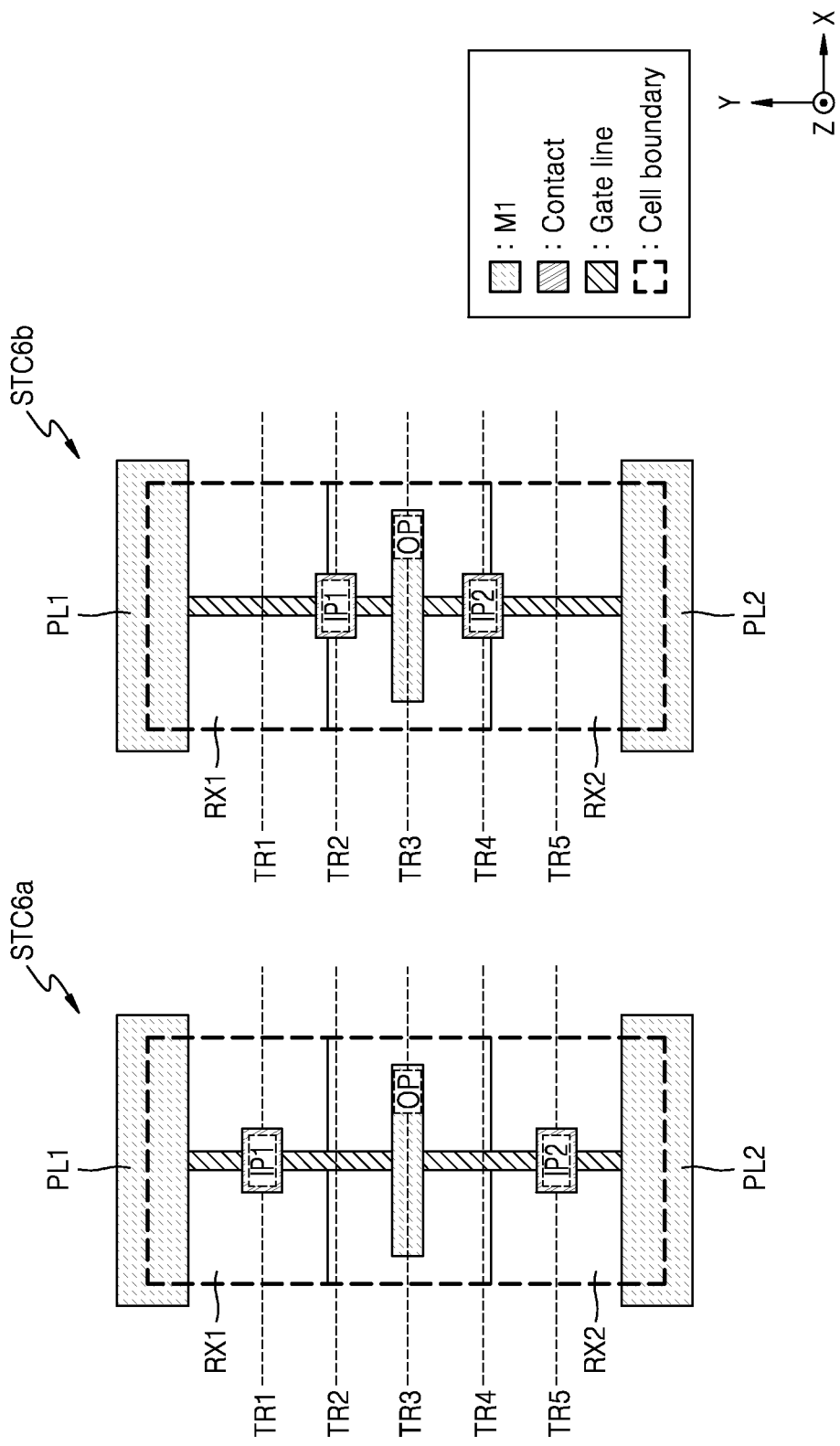
FIGS. 9 to 12 are plan views for describing standard cells of various layouts included in an integrated circuit according to an embodiment.

Referring to FIG. 9, each of the first standard cell STC6a and the second standard cell STC6b may include at least one input pin formed as a gate contact, for example, a first input pin IP1 and a second input pin IP2. The first input pin IP1 and the second input pin IP2 may be gate contacts formed over the same gate line. Each of the first standard cell STC6a and the second standard cell STC6b may include an output pin OP formed as a pattern of the first metal layer M1. In data about the first standard cell STC6a and the second standard cell STC6b stored in the standard cell library, at least one gate contact of the first standard cell STC6a and the second standard cell STC6b may be represented as a label indicating the input pin IP1 or IP2.

Each of the first standard cell STC6a and the second standard cell STC6b may receive an input signal through at least one of the first input pin IP1 and the second input pin IP2. For example, a routing line formed in the first metal layer M1 may be connected over the first input pin IP1 of the first standard cell STC6a, the first standard cell STC6a may receive an input signal from another standard cell through the first input pin IP1, the second input pin IP2 may be a dummy input pin, and a gate contact of the second input pin IP2 may be a dummy contact. Alternatively, for example, a routing line formed in the first metal layer M1 may be connected over the second input pin IP2 of the first standard cell STC6a, the first standard cell STC6a may receive an input signal from another standard cell through the second input pin IP2, the first input pin IP1 may be a dummy input pin, and a gate contact of the first input pin IP1 may be a dummy contact. Among the first input pin IP1 and the second input pin IP2 of each of the first standard cell STC6a and the second standard cell STC6b, the dummy input pin not connected to the routing line may be removed in a subsequent operation after the first standard cell STC6a or the second standard cell STC6b is arranged.

A plurality of tracks in which patterns of the first metal layer M1 are arranged, for example, a first track TR1, a second track TR2, a third track TR3, a fourth track TR4, and a fifth track TR5, may be formed in each of the first standard cell STC6a and the second standard cell STC6b. In an embodiment, each of the first standard cell STC6a and the second standard cell STC6b may include input pins formed in different tracks. For example, the first standard cell STC6a may include a first input pin IP1 of the gate contact arranged in the first track TR1 and a second input pin IP2 of the gate contact arranged in the fifth track TR5, and the second standard cell STC6b may include a first input pin IP1 of the gate contact arranged in the second track TR2 and a second input pin IP2 of the gate contact arranged in the fourth track TR4.

In an operation of arranging the standard cells with reference to the standard cell library, one of the first standard cell STC6a and the second standard cell STC6b including gate contacts of different tracks as input pins may be selectively arranged. Thus, in a method of manufacturing an integrated circuit according to an embodiment, among a plurality of standard cells performing the same function and including gate contacts formed at various positions as input pins, a standard cell may be selectively arranged in view of the ease of routing line formation, the operation characteristics of standard cells, or the like.

Figure 10:
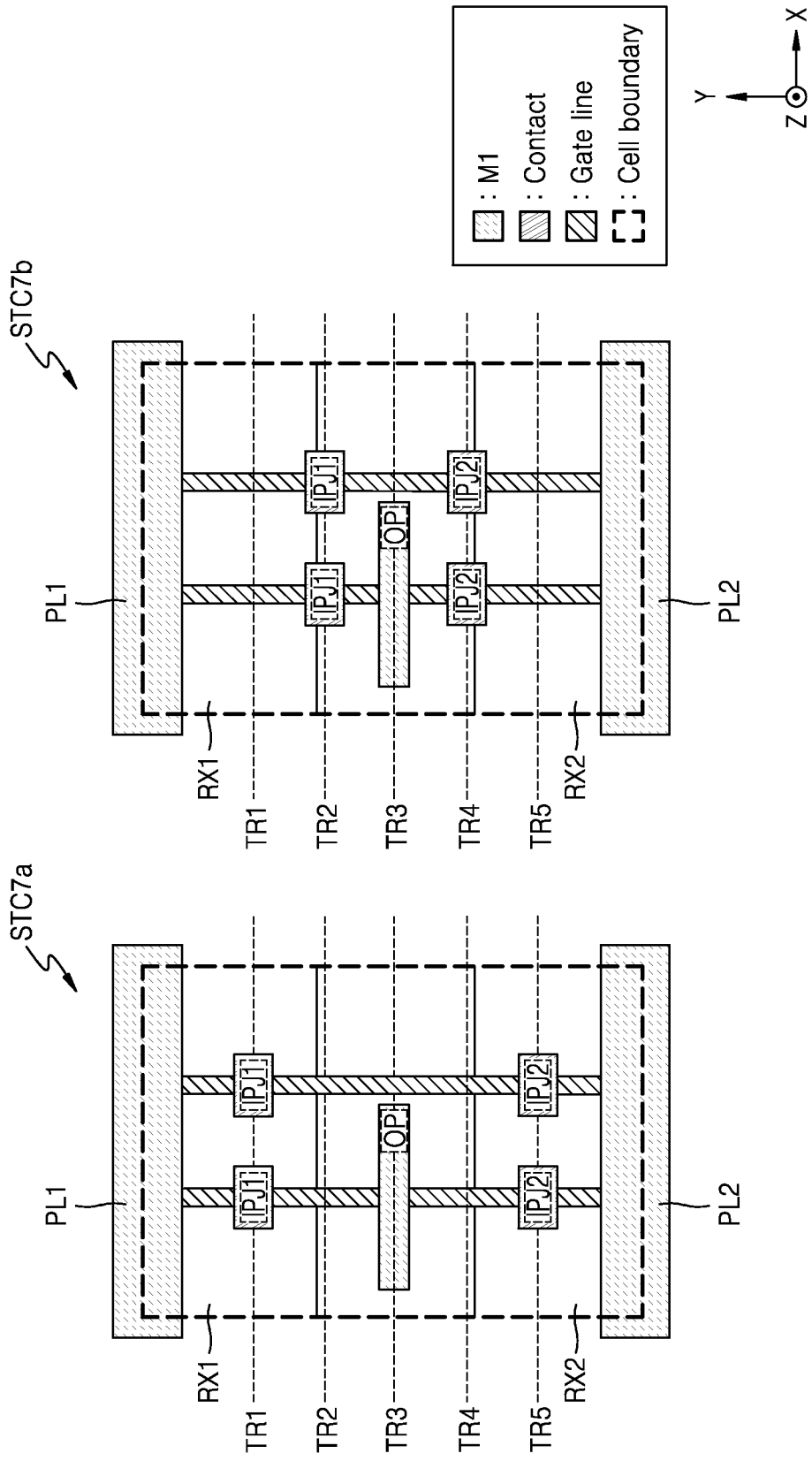

Referring to FIG. 10, each of the first standard cell STC7a and the second standard cell STC7b may include a plurality of input pins IPJ1 or IPJ2 arranged in parallel in the X-axis direction and formed as gate contacts. Each of the first standard cell STC7a and the second standard cell STC7b may include input pins formed in different tracks. For example, the first standard cell STC7a may include first input pins IPJ1 arranged in parallel in the first track TR1 and second input pins IPJ2 arranged in parallel in the fifth track TR5, and the second standard cell STC7b may include first input pins IPJ1 arranged in parallel in the second track TR2 and second input pins IPJ2 arranged in parallel in the fourth track TR4. In data about the first standard cell STC7a and the second standard cell STC7b stored in the standard cell library, the first input pins IPJ1 of the first standard cell STC7a and the second standard cell STC7b may be represented to be electrically connected to each other in a routing operation (e.g., operation S20 of FIG. 16), and the second input pins IPJ2 may be represented to be electrically connected to each other in a routing operation.

Each of the first standard cell STC7a and the second standard cell STC7b may receive an input signal through the first input pins IPJ1 or the second input pins IPJ2. For example, a routing line formed in the first metal layer M1 may be connected over the first input pins IPJ1 of the first standard cell STC7a, the same input signal may be received through the first input pins IPJ1, the second input pins IPJ2 may be dummy input pins, and gate contacts of the second input pins IPJ2 may be dummy contacts. Alternatively, for example, a routing line formed in the first metal layer M1 may be connected over the second input pins IPJ2 of the first standard cell STC7a, the same input signal may be received through the second input pins IPJ2, the first input pins IPJ1 may be dummy input pins, and gate contacts of the first input pins IPJ1 may be dummy contacts. Among the first input pins IPJ1 and the second input pins IPJ2 of each of the first standard cell STC7a and the second standard cell STC7b, the dummy input pins not connected to the routing line may be removed in a subsequent operation after the first standard cell STC7a or the second standard cell STC7b is arranged.

Figure 11:
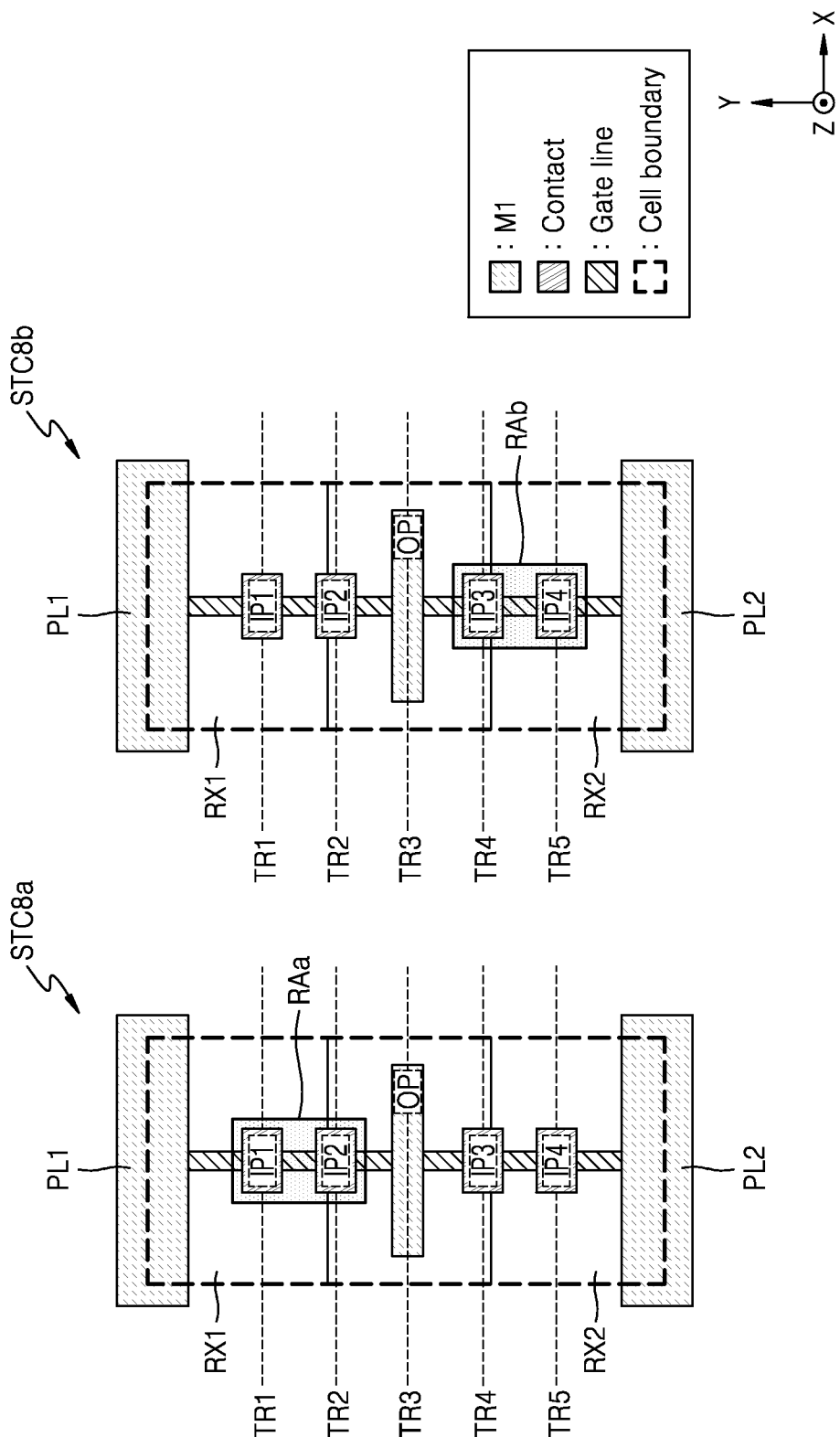

Referring to FIG. 11, each of the first standard cell STC8a and the second standard cell STC8b may include a first input pin IP1, a second input pin IP2, a third input pin IP3, and a fourth input pin IP4 formed as gate contacts. For example, each of the first standard cell STC8*a* and the second standard cell STC8*b* may include the first input pin IP1 arranged in the first track TR1, the second input pin IP2 arranged in the second track TR2, the third input pin IP3 arranged in the fourth track TR4, and the fourth input pin IP4 arranged in the fifth track TR5.

In each of the first standard cell STC8*a* and the second standard cell STC8*b*, a no-routing region RAa or RAb defined to prohibit formation of an interconnection may be formed over a gate line through which an input signal is received. In a routing operation (e.g., operation S20 of FIG. 16) of generating an interconnection between each of the first standard cell STC8*a* and the second standard cell STC8*b* and another standard cell with reference to the standard cell library, a routing line of the first metal layer M1 may be prohibited from being formed over the no-routing region RAa or RAb, and a gate via arranged between the first metal layer M1 and the gate contact may not be formed.

The no-routing region RAa of the first standard cell STC8*a* and the no-routing region RAb of the second standard cell STC8*b* may not coincide with each other. That is, the first standard cell STC8*a* and the second standard cell STC8*b* may be different from each other in terms of the position where the routing line of the first metal layer M1 formed to receive an input signal is formed. For example, the no-routing region RAa of the first standard cell STC8*a* may be formed in the first track TR1 and the second track TR2, and the routing line of the first metal layer M1 may be connected to at least one of the third input pin IP3 and the fourth input pin IP4 to receive an input signal. Also, for example, the no-routing region RAb of the second standard cell STC8*b* may be formed in the fourth track TR4 and the fifth track TR5, and the routing line of the first metal layer M1 may be connected to at least one of the first input pin IP1 and the second input pin IP2 to receive an input signal.

Figure 12:
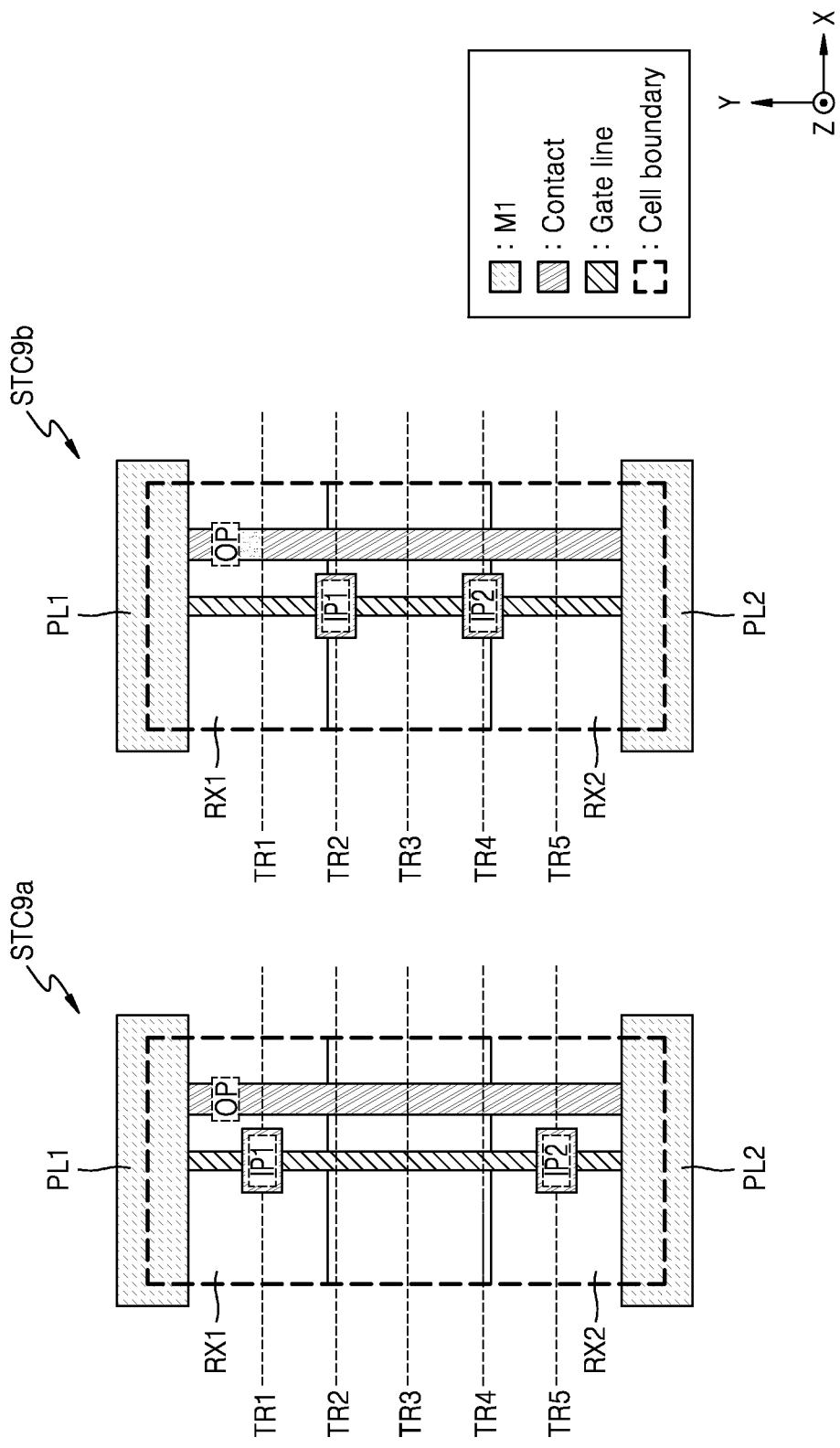

Referring to FIG. 12, each of the first standard cell STC9*a* and the second standard cell STC9*b* may include at least one input pin formed as a gate contact, for example, a first input pin IP1 and a second input pin IP2. Each of the first standard cell STC9*a* and the second standard cell STC9*b* may include an output pin OP formed as an active contact. In data about each of the first standard cell STC9*a* and the second standard cell STC9*b* stored in the standard cell library, a gate contact of each of the first standard cell STC9*a* and the second standard cell STC9*b* may be represented as a label indicating the input pin IP1 or the input pin IP2, and an active contact of each of the first standard cell STC9*a* and the second standard cell STC9*b* may be represented as a label indicating the output pin OP.

The active contact as the output pin OP may be formed to contact a source/drain region formed in at least one of the first active region RX1 and the second active region RX2. A routing line of the first metal layer M1 for electrically connecting each of the first standard cell STC9*a* and the second standard cell STC9*b* to another standard cell may be connected to the active contact that is the output pin OP.

Figure 13:
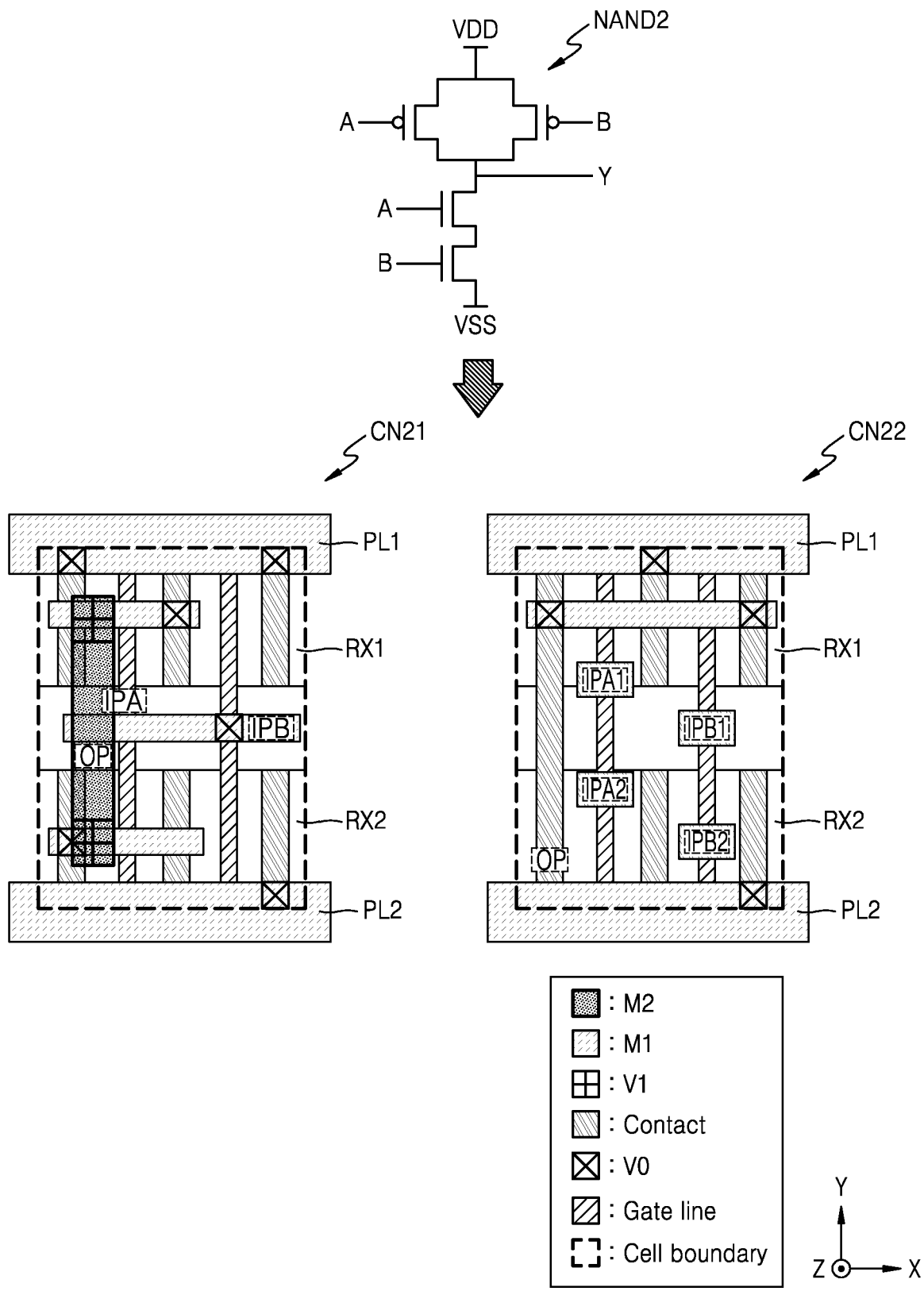
FIG. 13 is a layout diagram for describing a NAND circuit as an example of a standard cell included in an integrated circuit according to an embodiment.

FIG. 13 is a layout diagram for describing a NAND circuit as an example of a standard cell included in an integrated circuit according to an embodiment. The upper portion of FIG. 13 illustrates a circuit diagram of a NAND2 circuit, and the lower portion of FIG. 13 schematically illustrates the layouts of standard cells CN21 and CN22 corresponding to the NAND2 circuit on a plane including the X axis and the Y axis. FIG. 13 is a diagram for describing standard cells that perform the same function and have different layouts.

Referring to FIG. 13, a first input signal A and a second input signal B may be input to the NAND2 circuit, and an output signal Y may be output therefrom. The NAND2 circuit may include two N-type transistors and two P-type transistors.

The first standard cell CN21 may include a first input pin IPA through which the first input signal A is input and a second input pin IPB through which the second input signal B is input, and may include an output pin OP through which the output signal Y is output. The first input pin IPA may be formed as a gate line, the second input pin IPB may be formed as a pattern of the first metal layer M1, and the output pin OP may be formed as a pattern of the second metal layer M2.

The second standard cell CN22 may include first input pins IPA1 and IPA2 through which the first input signal A is input and second input pins IPB1 and IPB2 through which the second input signal B is input, and may include an output pin OP through which the output signal Y is output. The first input pins IPA1 and IPA2 may be formed as a gate contact formed to contact the gate line, the second input pins IPB1 and IPB2 may be formed as a gate contact, and the output pin OP may be formed as an active contact formed to contact the first active region RX1 and the second active region RX2.

The first standard cell CN21 and the second standard cell CN22 illustrated in FIG. 13 may be an example of the standard cell in which the NAND2 circuit is implemented, and in the standard cell in which the NAND2 circuit is implemented according to the embodiment illustrated in FIG. 13, at least one of the input pin through which the first input signal A is input and the input pin through which the second input signal B is input may be formed as a gate line or a gate contact, and the output pin through which the output signal Y is output may be formed as an active contact or a pattern of the first metal layer M1.

Figure 14A:
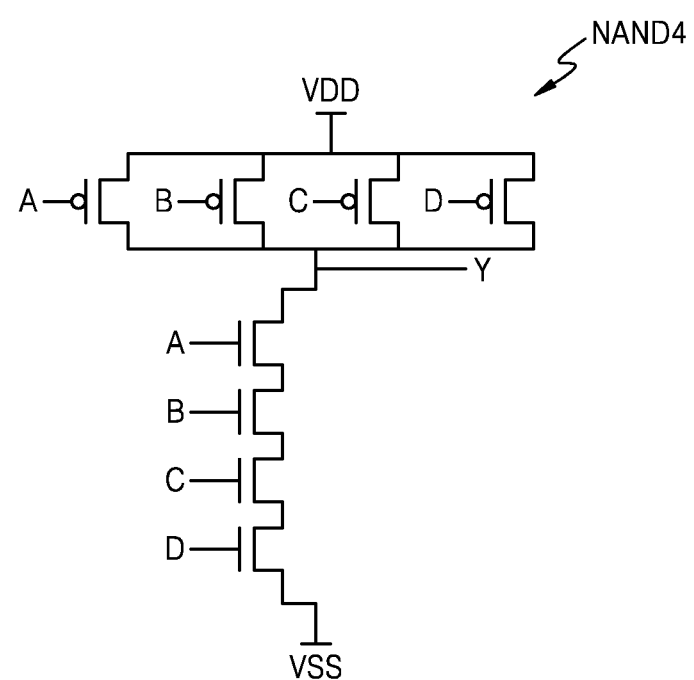
FIG. 14A is a circuit diagram illustrating a NAND circuit and FIG. 14B is a layout diagram for describing the NAND circuit, as an example of a standard cell included in an integrated circuit according to an embodiment.
Figure 14B:
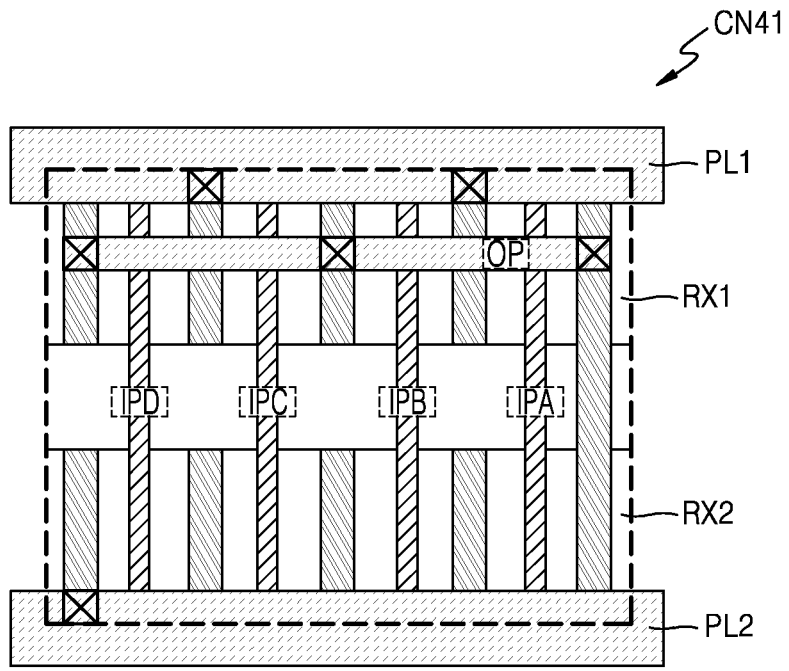
Figure 14B:
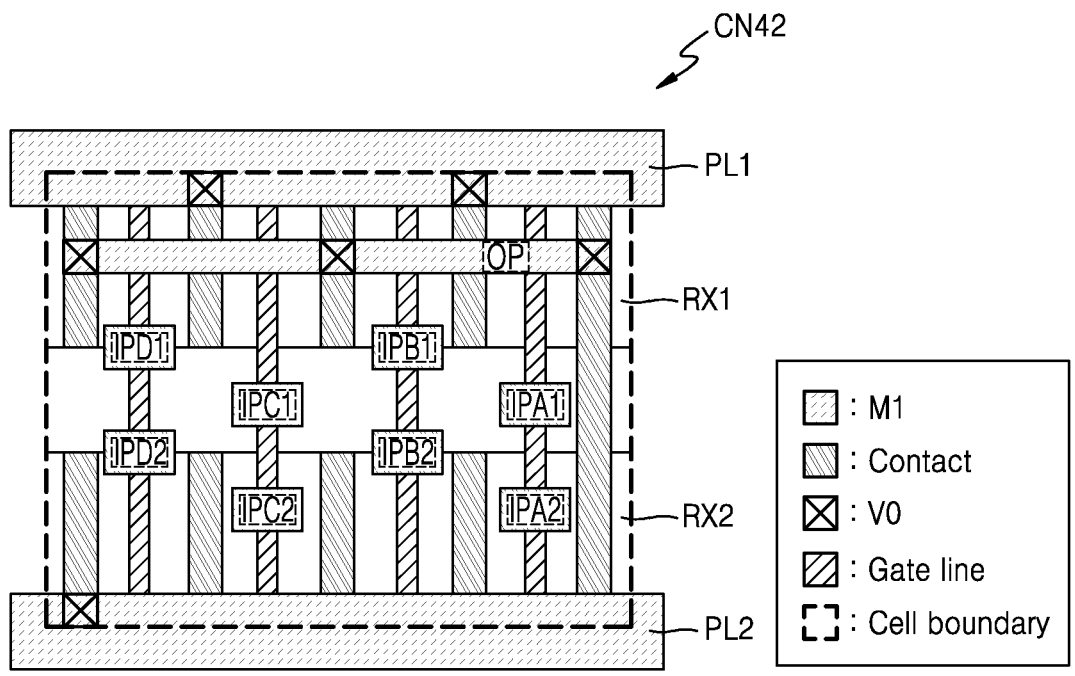

FIG. 14A is a circuit diagram illustrating a NAND circuit, and FIG. 14B is a layout diagram for describing a NAND circuit as an example of a standard cell included in an integrated circuit according to an embodiment. FIG. 14B schematically illustrates the layouts of standard cells CN41 and CN42 corresponding to a NAND4 circuit on a plane including the X axis and the Y axis. FIG. 14B is a diagram for describing different standard cells performing the same function.

Referring to FIGS. 14A and 14B, a first input signal A, a second input signal B, a third input signal C, and a fourth input signal D may be input to the NAND4 circuit, and an output signal Y may be output therefrom. The NAND4 circuit may include four N-type transistors and four P-type transistors.

The first standard cell CN41 may include a first input pin IPA through which the first input signal A is input, a second input pin IPB through which the second input signal B is input, a third input pin IPC through which the third input signal C is input, and a fourth input pin IPD through which the fourth input signal D is input, and may include an output pin OP through which the output signal Y is output. Each of the first to fourth input pins IPA to IPD may be formed as a gate line, and the output pin OP may be formed as a pattern of the first metal layer M1.

The second standard cell CN42 may include first input pins IPA1 and IPA2 through which the first input signal A is input, second input pins IPB1 and IPB2 through which the second input signal B is input, third input pins IPC1 and IPC2 through which the third input signal C is input, and fourth input pins IPD1 and IPD2 through which the fourth input signal D is input, and may include an output pin OP through which the output signal Y is output. The first input pins IPA1 and IPA2, the second input pins IPB1 and IPB2, the third input pins IPC1 and IPC2, and the fourth input pins IPD1 and IPD2 may be formed as a gate contact formed to contact the gate line, and the output pin OP may be formed as a pattern of the first metal layer M1.

The first standard cell CN41 and the second standard cell CN42 illustrated in FIGS. 14A and 14B may be an example of the standard cell in which the NAND24 circuit is implemented, and in the standard cell in which the NAND4 circuit is implemented according to the embodiment illustrated in FIGS. 14A and 14B, at least one of the input pins through which the first to fourth input signals A to D are input may be formed as a gate line or a gate contact, and the output pin through which the output signal Y is output may be formed as an active contact or a pattern of the first metal layer M1.

Figure 15A:
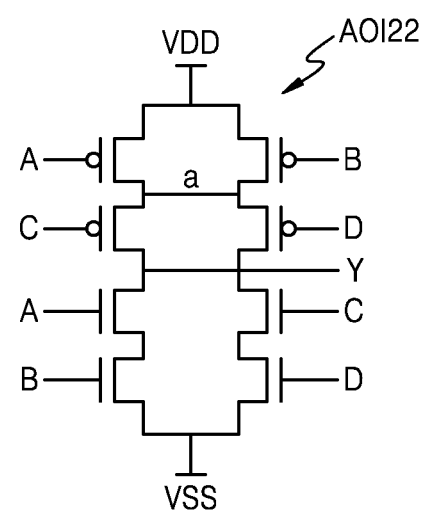
FIG. 15A is a circuit diagram illustrating an AND-OR-Inverter (AOI) circuit and FIGS. 15B and 15C are layout diagrams for describing the AOI circuit, as an example of a standard cell included in an integrated circuit according to an embodiment.
Figure 15B:
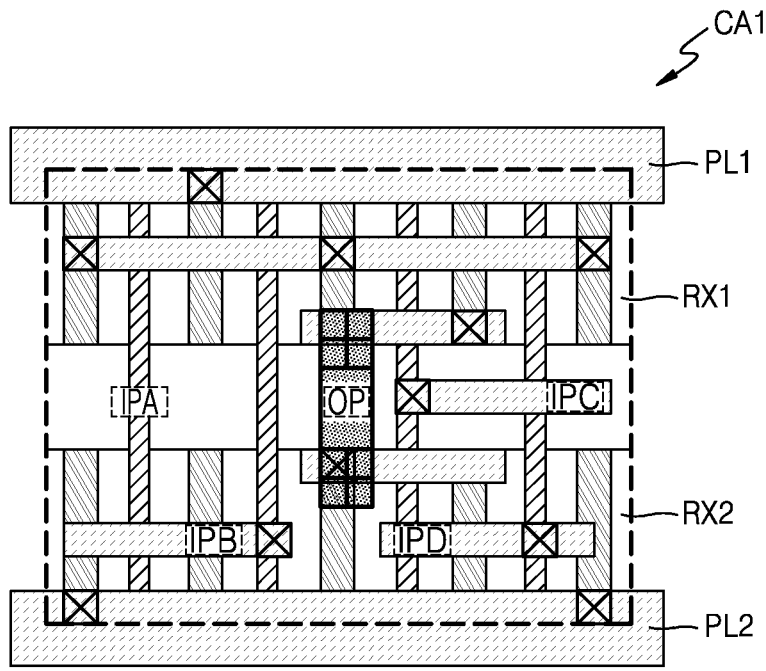
Figure 15B:
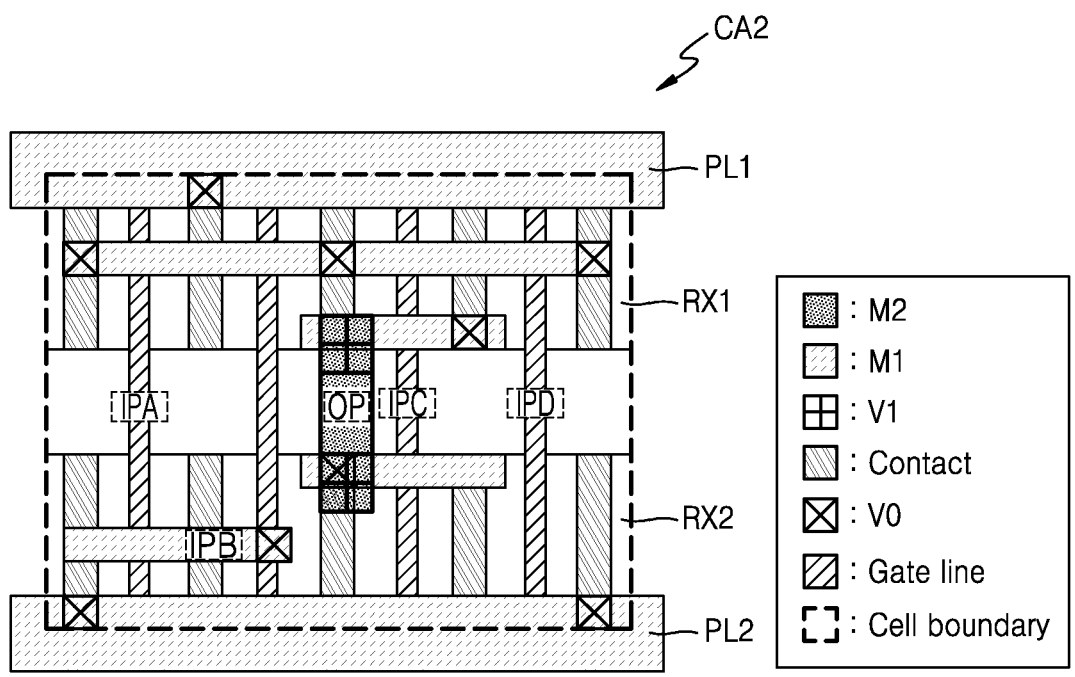
Figure 15C:
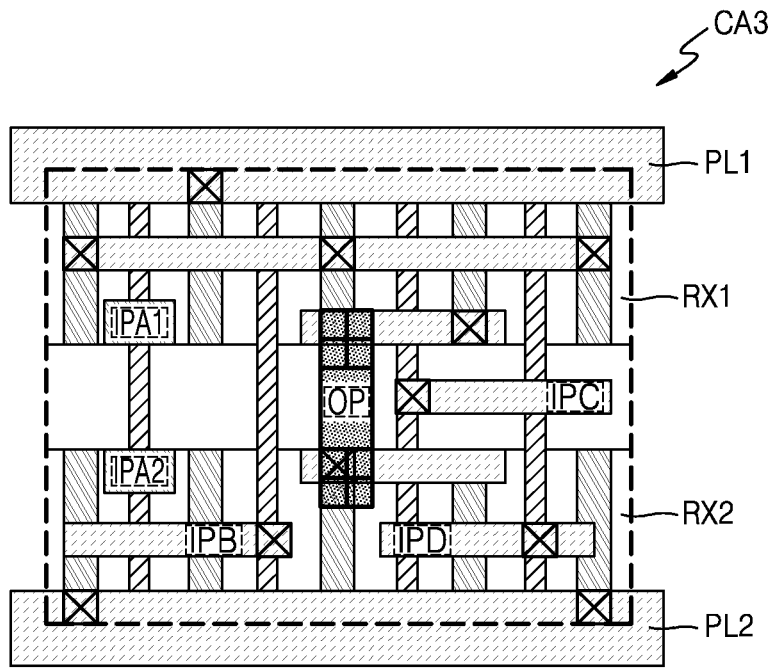
Figure 15C:
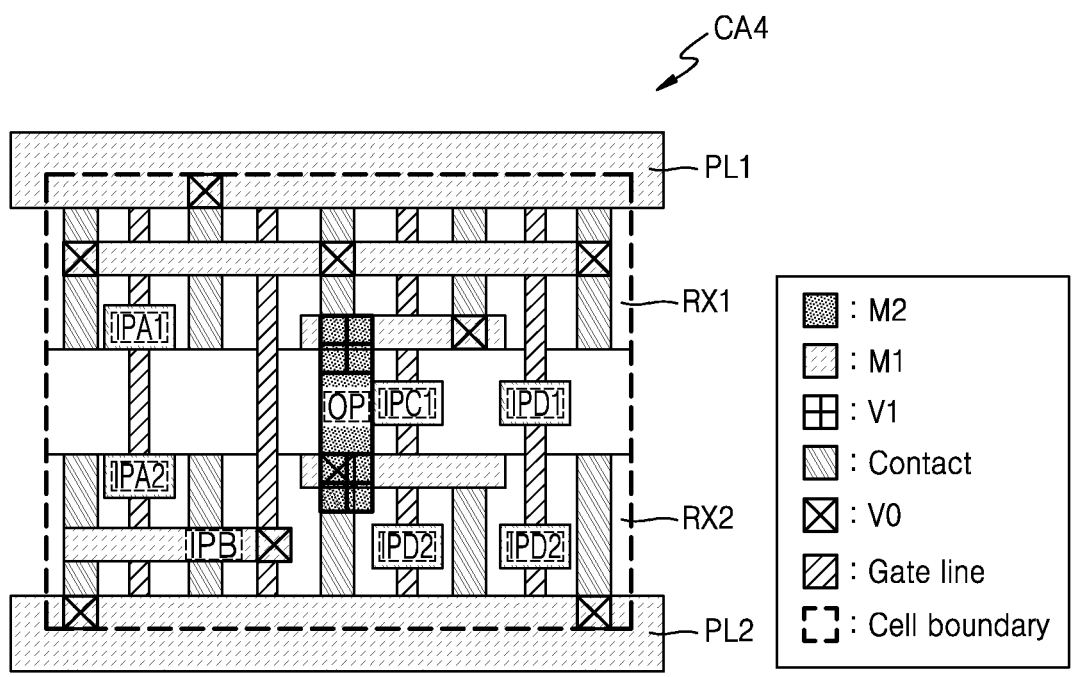
Figure 15C:
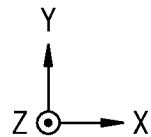

FIG. 15A is a circuit diagram illustrating an AND-OR-Inverter (AOI) circuit, and FIGS. 15B and 15C are layout diagrams for describing the AOI circuit as an example of a standard cell included in an integrated circuit according to an embodiment. FIGS. 15B and 15C schematically illustrate the layouts of standard cells CA1 to CA4 corresponding to the AOI circuit on a plane including the X axis and the Y axis. FIGS. 15B and 15C are diagrams for describing different standard cells performing the same function.

Referring to FIGS. 15A to 15C, a first input signal A, a second input signal B, a third input signal C, and a fourth input D may be input to the AOI circuit AOI22, and an output signal Y may be output therefrom. The AOI22 circuit may include four N-type transistors and four P-type transistors. According to the function of the AOI22, when at least one of the first input signal A and the second input signal B is logic low and at least one of the third input signal C and the fourth input signal D is logic low, the AOI22 circuit may output the output signal Y logic high.

The first standard cell CA1 may include a first input pin IPA through which the first input signal A is input, a second input pin IPB through which the second input signal B is input, a third input pin IPC through which the third input signal C is input, and a fourth input pin IPD through which the fourth input signal D is input, and may include an output pin OP through which the output signal Y is output. The first input pin IPA may be formed as a gate line, the second to fourth input pins IPB to IPD may be formed as a pattern of the first metal layer M1, and the output pin OP may be formed as a pattern of the second metal layer M2.

The second standard cell CA2 may include a first input pin IPA through which the first input signal A is input, a second input pin IPB through which the second input signal B is input, a third input pin IPC through which the third input signal C is input, and a fourth input pin IPD through which the fourth input signal D is input, and may include an output pin OP through which the output signal Y is output. Each of the first input pin IPA, the third input pin IPC, and the fourth input pin IPD may be formed as a gate line, the second input pin IPB may be formed as a pattern of the first metal layer M1, and the output pin OP may be formed as a pattern of the second metal layer M2.

The third standard cell CA3 may include first input pins IPA1 and IPA2 through which the first input signal A is input, a second input pin IPB through which the second input signal B is input, a third input pin IPC through which the third input signal C is input, and a fourth input pin IPD through which the fourth input signal D is input, and may include an output pin OP through which the output signal Y is output. The first input pins IPA1 and IPA2 may be formed as a gate contact, the second to fourth input pins IPB to IPD may be formed as a pattern of the first metal layer M1, and the output pin OP may be formed as a pattern of the second metal layer M2.

The fourth standard cell CA4 may include first input pins IPA1 and IPA2 through which the first input signal A is input, a second input pin IPB through which the second input signal B is input, third input pins IPC1 and IPC2 through which the third input signal C is input, and fourth input pins IPD1 and IPD2 through which the fourth input signal D is input, and may include an output pin OP through which the output signal Y is output. The first input pins IPA1 and IPA2, the third input pins IPC1 and IPC2, and the fourth input pins IPD1 and IPD2 may be formed as a gate contact, the second input pin IPB may be formed as a pattern of the first metal layer M1, and the output pin OP may be formed as a pattern of the second metal layer M2.

The first to fourth standard cells CA1 to CA4 illustrated in FIGS. 15A to 15C may be an example of the standard cell in which the AOI circuit AOI22 is implemented, and in the standard cell in which the AOI circuit AOI22 is implemented according to the embodiment of FIGS. 15A-15C, at least one of the input pins through which the first to fourth input signals A to D are input may be formed as a gate line or a gate contact, and the output pin through which the output signal Y is output may be formed as an active contact or a pattern of the first metal layer M1.

Figure 16:
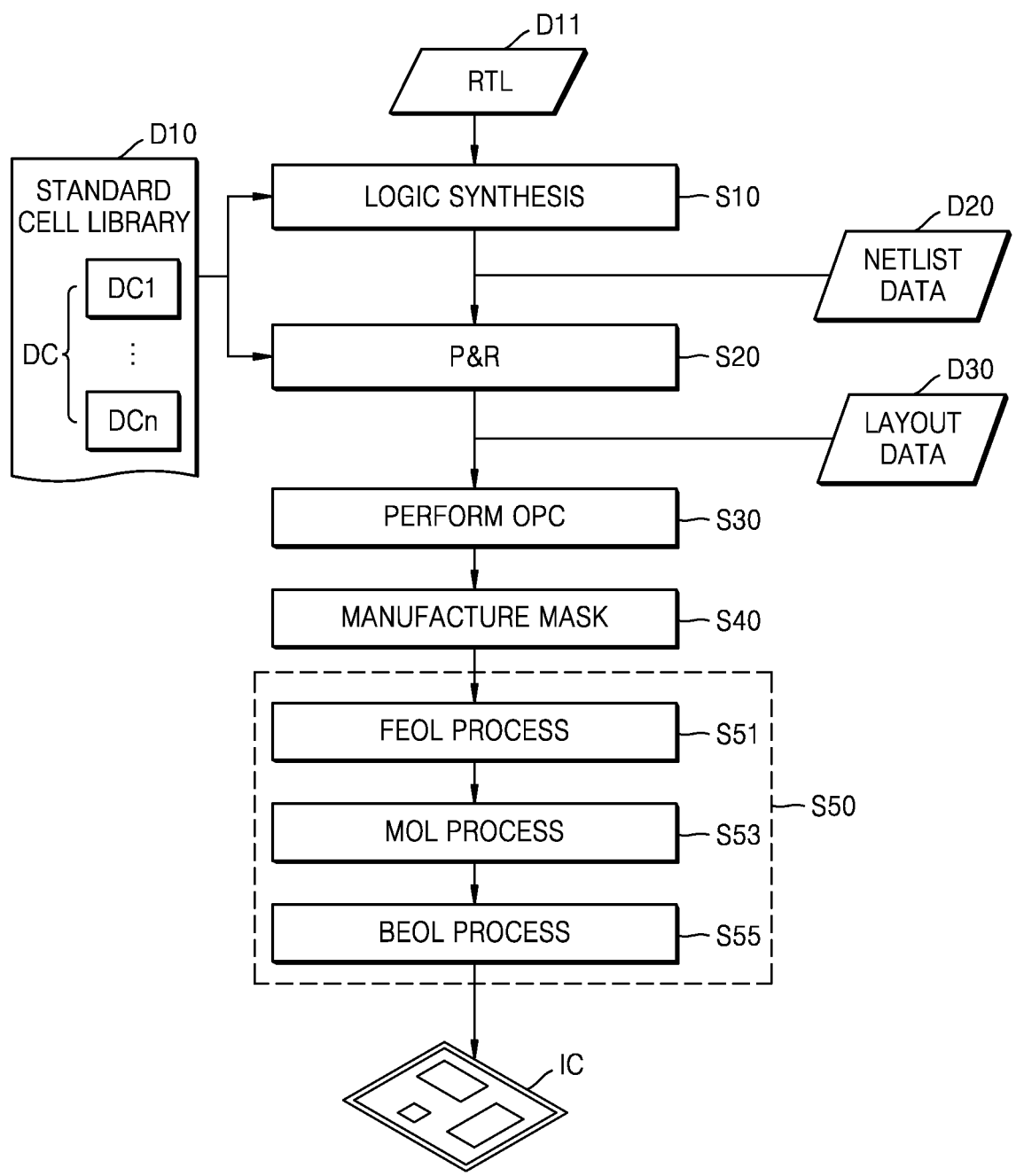
FIG. 16 is a flowchart illustrating a method of fabricating an integrated circuit according to an embodiment.

FIG. 16 is a flowchart illustrating a method of fabricating an integrated circuit according to an embodiment.

Referring to FIG. 16, a standard cell library D10 may include information about standard cells, such as function information, characteristic information, and layout information. The standard cell library D10 may include data DC defining the layout of standard cells. The data DC may include data defining the structure of standard cells that perform the same function and have different layouts. The data DC may include data defining the structure of the standard cells described with reference to FIGS. 1 to 15C. The data DC may include first data DC1 defining the structure of standard cells performing a first function and having different layouts, and n-th data DCn defining the structure of standard cells performing an n-th function and having different layouts (where "n" is a natural number greater than or equal to 2).

For example, the first data DC1 may include data defining the structure of standard cells performing a first function and including an input pin formed as a gate line or a gate contact, and the first data DC1 may include data defining the structure of standard cells performing a first function and including an output pin formed as a metal layer or an active contact.

Operations S10 and S20 may be an operation of designing an integrated circuit IC, in which layout data D30 may be generated from RTL data D11. The integrated circuit IC may be the integrated circuit 10 of FIG. 1. In operation S10, a logic synthesis operation of generating netlist data D20 from the RTL data D11 may be performed. For example, a semiconductor design tool (e.g., a logic synthesis module) may generate the netlist data D20 including a netlist or a bitstream by performing a logic synthesis with reference to the standard cell library D10 from the RTL data D11 written in Hardware Description Language (HDL) such as Verilog and VHSIC Hardware Description Language (VHDL). The standard cell library D10 may include the data DC defining the structure of standard cells performing the same function and having different layouts, and the standard cells may be included in the integrated circuit IC in a logic synthesis process with reference to such information.

In operation S20, a placement & routing (P&R) operation of generating the layout data D30 from the netlist data D20 may be performed. The layout data D30 may have a format such as GDSII and may include geometric information of standard cells and interconnections.

For example, a semiconductor design tool (e.g., a P&R module) may arrange a plurality of standard cells with reference to the standard cell library D10 from the netlist data D20. With reference to the data DC, the semiconductor design tool may select one of the layouts of the standard cell defined by a netlist D103 and may arrange the selected layout of the standard cell. For example, operation S20 may include operations S21 to S25 of FIG. 17 and may include operations S21' to S25' of FIG. 19.

In operation S20, an operation of generating interconnections may be further performed. The interconnection may electrically connect an output pin and an input pin of the standard cell and may include, for example, a conductive pattern formed in at least one metal layer and at least one via. In an embodiment, routing lines and vias formed when the standard cells described with reference to FIGS. 1 to 15C are connected to another standard cell may be generated. In the case of the standard cell in which a plurality of input pins receiving the same input signal are defined, routing lines and vias for electrically connecting the plurality of input pins may be formed in an interconnect generating operation.

In operation S30, an optical proximity correction (OPC) may be performed. The OPC may refer to an operation for forming a pattern of a desired shape by correcting a distortion phenomenon such as refraction caused by the characteristics of light in photolithography included in a semiconductor process for manufacturing the integrated circuit IC, and a pattern on a mask may be determined by applying the OPC to the layout data D30. In an embodiment, the layout of the integrated circuit IC may be restrictively modified in operation S30, and the restrictive modification of the integrated circuit IC in operation S30 may be referred to as design polishing as postprocessing for optimizing the structure of the integrated circuit IC.

In operation S40, an operation of manufacturing a mask may be performed. For example, as the OPC is applied to the layout data D30, patterns on a mask may be defined to form patterns formed in a plurality of layers, and at least one mask (or at least one photomask) for forming patterns of each of a plurality of layers may be manufactured.

In operation S50, an operation of fabricating the integrated circuit IC may be performed. For example, the integrated circuit IC may be fabricated by patterning a plurality of layers by using at least one mask manufactured in operation S40. Operation S50 may include operations S51, S53, and S55.

In operation S51, a front-end-of-line (FEOL) process may be performed. The FEOL process may refer to a process of forming individual devices such as transistors, capacitors, or resistors in a substrate in the process of fabricating the integrated circuit IC. For example, the FEOL process may include an operation of planarizing and cleaning a wafer, an operation of forming trenches, an operation of forming wells, an operation of forming gate lines, and an operation of forming source and drain regions.

In operation S53, a middle-of-line (MOL) process may be performed. The MOL process may refer to a process of forming a connection member for connecting the individual devices generated through the FEOL process, in the standard cell. For example, the MOL process may include an operation of forming an active contact over the active region, an operation of forming a gate contact over the gate line, and an operation of forming a via over the active contact and the gate line.

In operation S55, a back-end-of-line (BEOL) process may be performed. The BEOL process may refer to a process of interconnecting individual devices such as transistors, capacitors, or resistors in the process of fabricating the integrated circuit IC. For example, the BEOL process may include an operation of performing silicidation of the gate, source, and drain regions, an operation of adding a dielectric, a planarization operation, an operation of forming holes, an operation of forming metal layers, an operation of forming vias between the metal layers, and an operation of forming a passivation layer. Thereafter, the integrated circuit IC may be packaged in a semiconductor package and may be used as a component in various applications.

Figure 17:
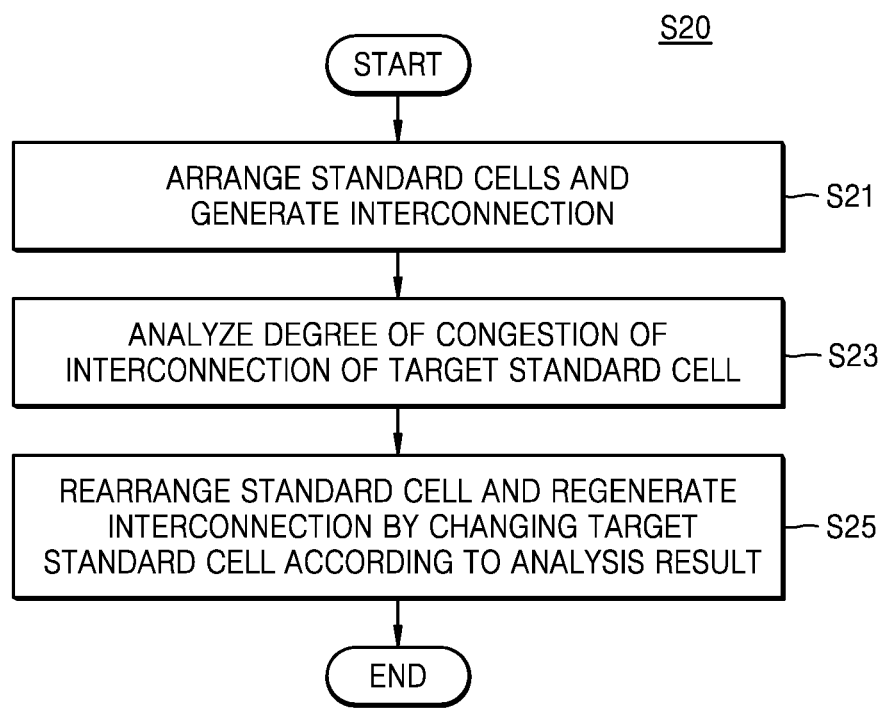
FIG. 17 is a flowchart illustrating a method of designing an integrated circuit according to an embodiment.
Figure 18A:
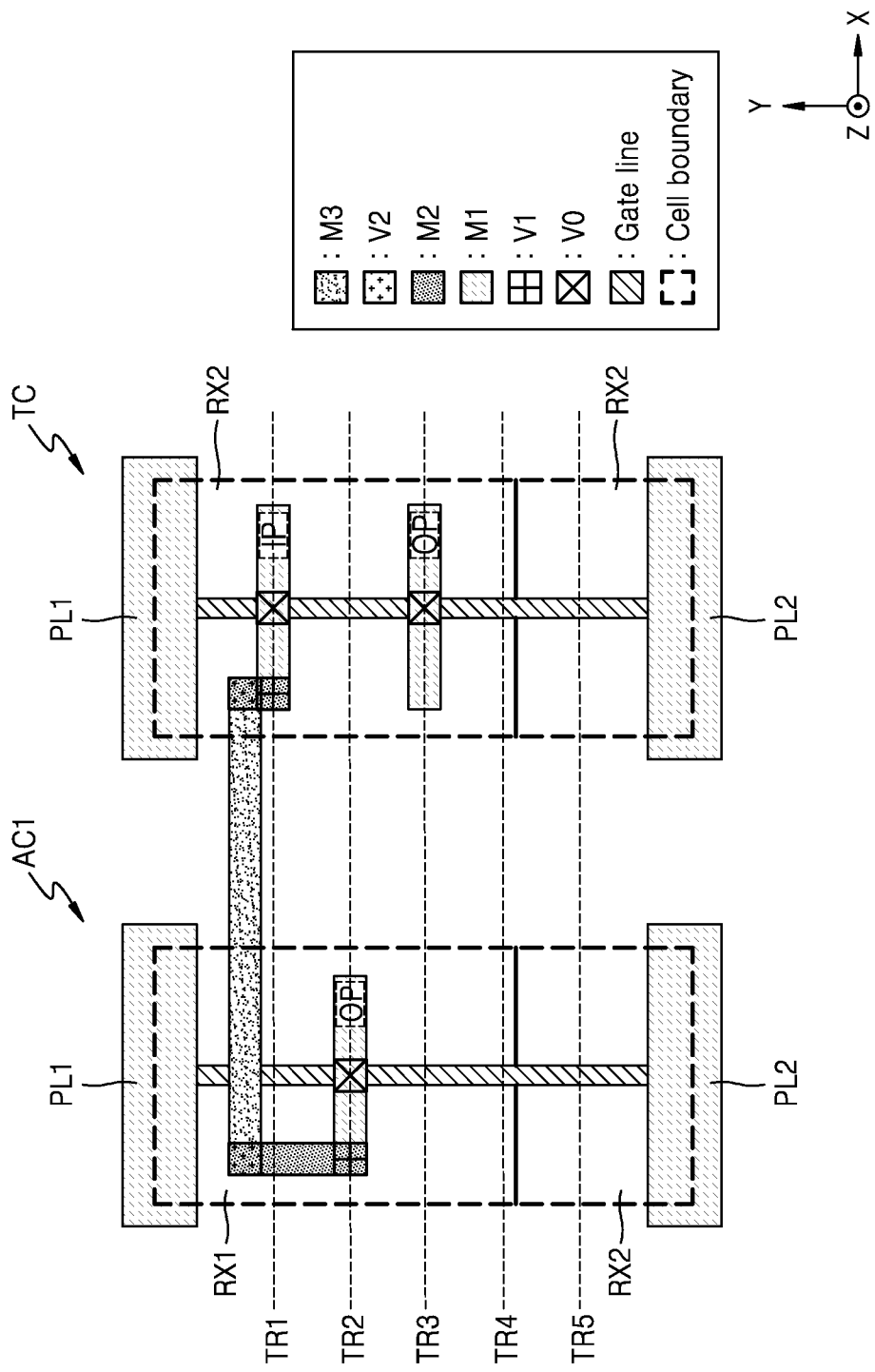
FIGS. 18A and 18B are diagrams for describing the method of FIG. 17, according to an embodiment.
Figure 18B:
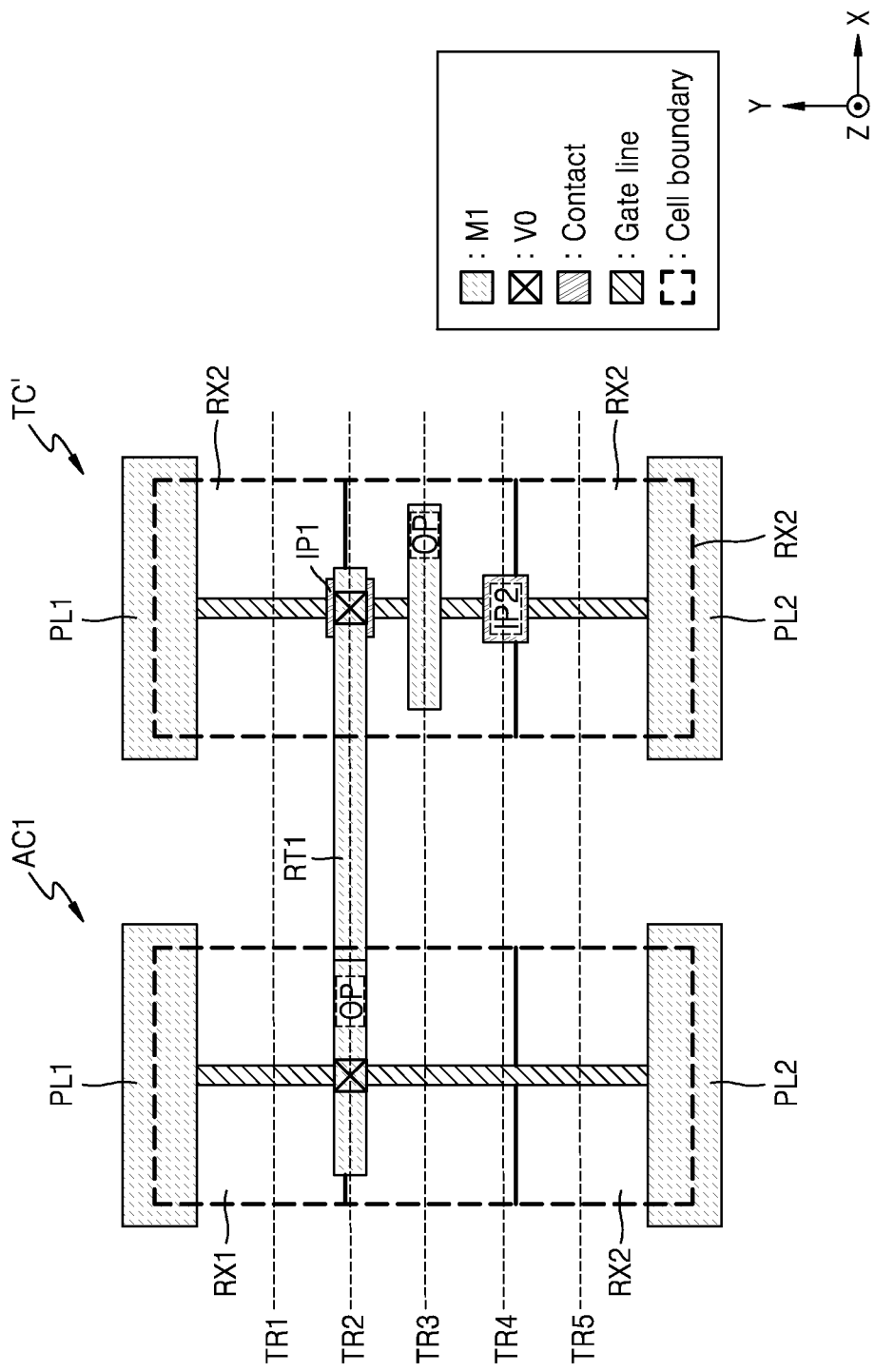

FIG. 17 is a flowchart illustrating a method of designing an integrated circuit according to an embodiment. FIGS. 18A and 18B are diagrams for describing the method of FIG. 17. Operation S20 of FIG. 17 may be an example of operation S20 of FIG. 16, may include operations S21 to S25, and may be performed with reference to the standard cell library D10 of FIG. 16.

Referring to FIG. 17, in operation S21, standard cells may be arranged and an interconnection between the standard cells may be generated. In operation S23, the degree of congestion of the interconnection of a target standard cell may be analyzed. That is, the degree of congestion of the interconnection may be analyzed from an arrangement relationship between the first standard cell providing an input signal to the arranged target standard cell and the second standard cell to which the target standard cell provides an output signal.

Referring to FIGS. 17 and 18A, a target standard cell TC and a first standard cell AC1 providing an input signal to the target standard cell TC may be arranged in parallel in the X-axis direction, and an output pin OP of the target first standard cell AC1 and an input pin IP of the target standard cell TC may be arranged in different tracks. For example, the output pin OP of the first standard cell AC1 may be formed as a pattern of the first metal layer M1 arranged in the second track TR2, and the input pin IP of the target standard cell TC may be formed as a pattern of the first metal layer M1 arranged in the first track TR1.

In order to form an interconnection between the output pin OP of the first standard cell AC1 and the input pin IP of the target standard cell TC, the second metal layer M2 that is an upper layer over the first metal layer M1 and a pattern of a third metal layer M3 may have to be formed and a second via V1 connecting the first metal layer M1 to the second metal layer M2 and a third via V2 connecting the second metal layer M2 to the third metal layer M3 may have to be formed. Thus, because vias V1 and V2 and patterns of the metal layers M2 and M3 may be required to form the interconnection, the degree of congestion of the interconnection between the target standard cell TC and the first standard cell AC1 may be determined to be relatively high.

Although FIG. 18A illustrates a degree of congestion of the interconnection between the target standard cell TC and the first standard cell AC1 arranged in parallel in the X-axis direction, even when the target standard cell TC receives an input signal from the second standard cell arranged in parallel to the target standard cell TC in the Y-axis direction, it may be necessary to form a routing line of the second metal layer M2 that is an upper layer over the first metal layer M1.

Referring back to FIG. 17, in operation S25, a standard cell may be rearranged and an interconnection may be generated by changing the target standard cell into another standard cell according to the result of analyzing the degree of congestion of the interconnection. In this case, the rearranged standard cell may be a standard cell that performs the same function as the target standard cell and includes an input pin of a gate contact or a gate line.

Referring to FIGS. 17 and 18B, a standard cell TC' rearranged after the target standard cell is removed may perform the same function as the target standard cell TC of FIG. 18A and may include a first input pin IP1 and a second input pin IP2 that are respectively formed as gate contacts. One of the first input pin IP1 and the second input pin IP2 may be arranged in the same track as the output pin OP of the first standard cell AC1. For example, the first input pin IP1 may be arranged in the second track TR2.

In order to generate an interconnection between the output pin OP of the first standard cell AC1 and the first input pin IP1 of the rearranged standard cell TC', a routing line RT1 of the first metal layer M1 contacting the output pin OP of the first standard cell AC1 and extending in the X-axis direction may be formed. Also, a first via V0 for connecting the first input pin IP1 to the routing line RT1 may be formed. Compared with the target standard cell TC of FIG. 18A, the degree of congestion of the interconnection between the rearranged standard cell TC' and the first standard cell AC1 may be relatively low.

Thus, in the integrated circuit designing method according to the embodiment of FIGS. 16-17, with reference to the standard cell library (e.g., D10 of FIG. 16), the standard cell including a gate line or a gate contact as an input pin may be arranged, the degree of freedom of the routing operation may be increased, and the degree of congestion of the routing lines may be reduced. In FIG. 18B, a case where the first input pin IP1 and the second input pin IP2 are formed as a gate contact has been described as an example of the rearranged standard cell TC'; however, embodiments are not limited thereto and in some embodiments the standard cell including an input pin of the gate line may be rearranged instead of the target standard cell.

Figure 19:
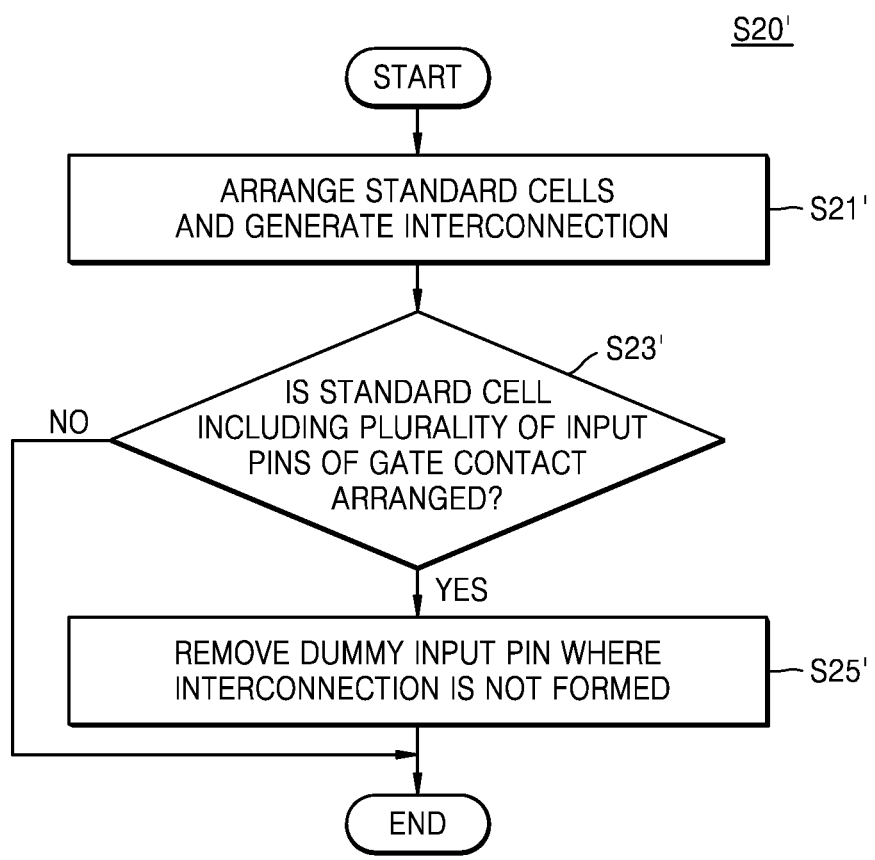
FIG. 19 is a flowchart illustrating a method of designing an integrated circuit according to an embodiment.

FIG. 19 is a flowchart illustrating a method of designing an integrated circuit according to an embodiment. Operation S20' of FIG. 19 may be an example of operation S20 of FIG. 16, may include operations S21' to S25', and may be performed with reference to the standard cell library D10 of FIG. 16.

Referring to FIG. 19, in operation S21', standard cells may be arranged and an interconnection between the standard cells may be generated. In operation S23', it may be determined whether a standard cell including a plurality of input pins of the gate contact has been arranged. For example, at least one of the standard cells STC6a, STC6b, the standard cells STC7a, STC7b, the standard cells STC8a, STC8b, and the standard cells STC9a, and STC9b illustrated in FIGS. 9 to 12 and the standard cells CN22, CN42, CA3, and CA4 illustrated in FIGS. 13 to 15C may be arranged in operation S21'.

In operation S25', when it is determined that the standard cell including a plurality of input pins of the gate contact has been arranged, a dummy input pin of the gate contact where the interconnection is not formed, among the plurality of input pins may be removed. For example, the second input pin IP2 of the standard cell TC' of FIG. 18B through which the input signal is not input may be a dummy input pin and may be removed in operation S25'. Alternatively, the dummy input pin may be maintained in operation S25', and the dummy input pin may not be generated in the MOL process operation S53 of FIG. 16. However, unlike the description in FIG. 19, in some embodiments, a dummy input pin of the gate contact may not be removed in operation S25' but may be generated in the MOL process operation S53 of FIG. 16 and included in the integrated circuit IC.

Figure 20:
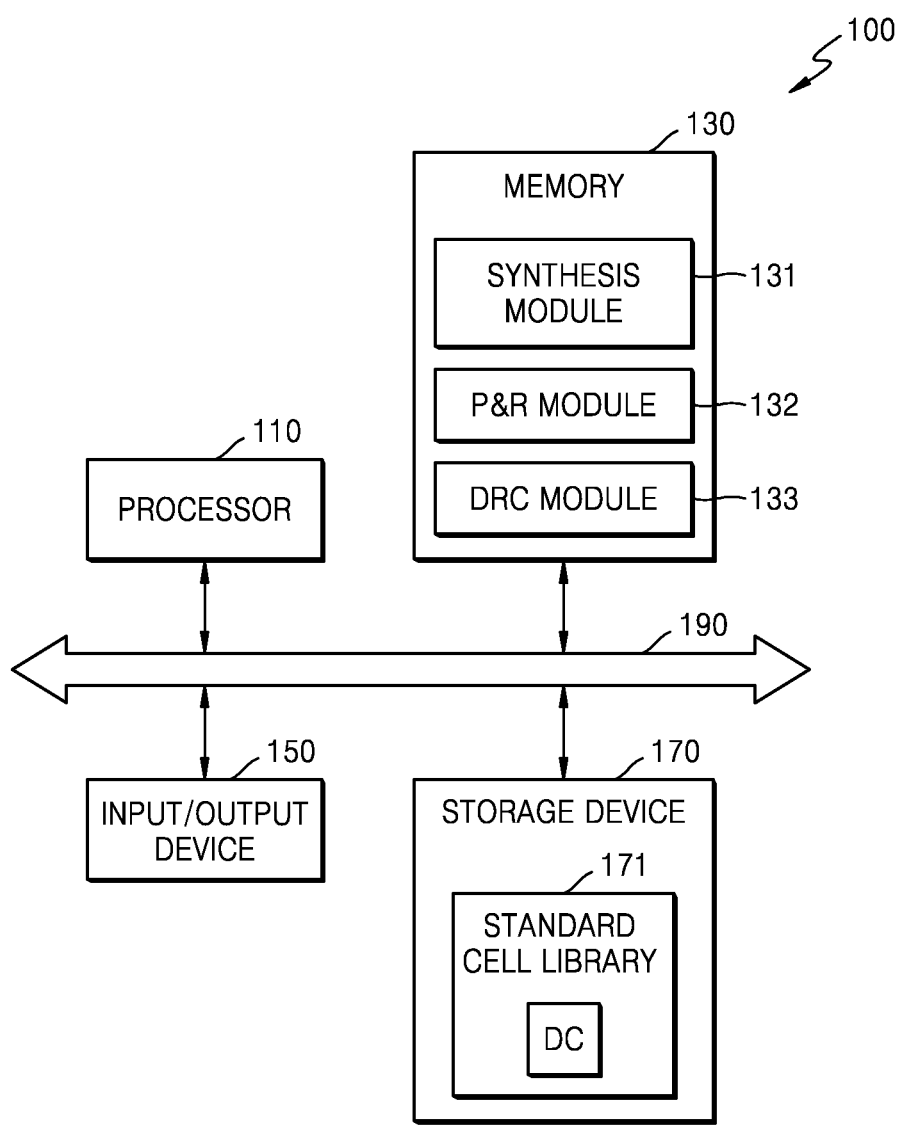
FIG. 20 is a block diagram illustrating a computing system for designing an integrated circuit according to an embodiment.

FIG. 20 is a block diagram illustrating a computing system for designing an integrated circuit according to an embodiment.

Referring to FIG. 20, a computing system 100 for designing an integrated circuit (hereinafter referred to as an "integrated circuit designing system") may include a processor 110, a memory 130, an input/output device 150, a storage device 170, and a bus 190. The integrated circuit designing system 100 may perform an integrated circuit design operation including operations S10 and S20 of FIG. 16 and may perform an integrated circuit design operation including operations S21 to S25 of FIG. 17 and/or operations S21' to S25' of FIG. 19. In some embodiments, the integrated circuit designing system 100 may also control components to perform the operations S30-S50 of FIG. 16. In an embodiment, the integrated circuit designing system 100 may be implemented as an integrated device and thus may be referred to as an integrated circuit design apparatus. The integrated circuit designing system 100 may be provided as a dedicated apparatus for designing an integrated circuit of a semiconductor apparatus or may be a computer for driving various simulation tools or design tools. The integrated circuit designing system 100 may be a stationary computing system such as a desktop computer, a workstation, or a server or may be a portable computing system such as a laptop computer.

The processor 110 may be configured to execute instructions for performing at least one of various operations for designing an integrated circuit. For example, like a microprocessor, an application processor (AP), a digital signal processor (DSP), and a GPU, the processor 110 may include a core capable of executing any instruction set (e.g., Intel Architecture-32 (IA-32), 64-bit extension IA-32, x86-64, PowerPC, SPARC, MIPS, ARM, or IA-64). The processor 110 may communicate with the memory 130, the input/output device 150, and the storage device 170 through the bus 190. The processor 110 may execute an integrated circuit design operation by driving a synthesis module 131, a P&R module 132, and a design rule check (DRC) module 133 loaded in the memory 130.

The memory 130 may store the synthesis module 131, the P&R module 132, and the DRC module 133. The synthesis module 131, the P&R module 132, and the DRC module 133 may be loaded into the memory 130 from the storage device 170. The synthesis module 131 may be, for example, a program including a plurality of instructions for performing a logic synthesis operation according to operation S10 of FIG. 16. The P&R module 132 may be, for example, a program including a plurality of instructions for performing a layout design operation according to operations S21 and S25 of FIG. 17 and operations S21' of FIG. 19.

The DRC module 133 may determine whether there is a design rule error. The DRC module 133 may be, for example, a program including a plurality of instructions for performing a DRC operation including a design rule verification operation (congestion determination operation) according to operation S23 of FIG. 17. When there is a design rule violation, the P&R module 132 may adjust the layout of an arranged standard cell. When there is no design rule error, the layout design of the integrated circuit may be completed. For example, when it is determined that the degree of congestion of each of the metal layers does not satisfy the design rule, the standard cells may be rearranged and an interconnection between the standard cells may be regenerated.

The memory 130 may be a volatile memory such as static random access memory (SRAM) or dynamic RAM (DRAM) or may be a nonvolatile memory such as phase change RAM (PRAM), resistive RAM (ReRAM), nano floating gate memory (NFGM), polymer random access (PoRAM), magnetic RAM (MRAM), ferroelectric RAM (FRAM), or flash memory.

The input/output device 150 may control the user input and output from user interface devices. For example, the input/output device 150 may include an input device such as a keyboard, a mouse, or a touch pad to receive input data or the like defining the integrated circuit. For example, the input/output device 150 may include an output device such as a display or a speaker to display an arrangement result, a routing result, layout data, a DRC result, or the like.

The storage device 170 may store a program such as the synthesis module 131, the P&R module 132, and the DRC module 133, and the program or at least a portion thereof may be loaded into the memory 130 from the storage device 170 before the program is executed by the processor 110. The storage device 170 may also store data to be processed by the processor 110 or data processed by the processor 110. For example, the storage device 170 may store data (e.g., a standard cell library 171 and netlist data) to be processed by the program such as the synthesis module 131, the P&R module 132, and the DRC module 133 and data (e.g., a DRC result and layout data) generated by the program. The standard cell library 171 stored in the storage device 170 may be the standard cell library D10 of FIG. 16.

For example, the storage device 170 may include a nonvolatile memory such as electrically erasable programmable read-only memory (EEPROM), flash memory, PRAM, RRAM, MRAM, or FRAM and may include a storage medium such as memory card (MMC, eMMC, SD, MicroSD, or the like), solid state drive (SSD), hard disk drive (HDD), magnetic tape, optical disk, or magnetic disk. Also, the storage device 170 may be detachable from the integrated circuit designing system 100.

While various embodiments have been particularly shown and described above, it will be understood that various changes in form and details may be made therein without departing from the spirit and scope of the following claims.

What is claimed is:

1. An integrated circuit comprising a plurality of standard cells performing a same function,
   wherein the plurality of standard cells include a first standard cell and a second standard cell, and
   the first standard cell and the second standard cell are the same as each other in terms of an arrangement of internal conductive patterns and are different from each other in terms of a position of a via formed over a gate line through which an input signal is input.

2. The integrated circuit of claim 1, wherein the first standard cell and the second standard cell are different from each other in terms of a position of a gate contact formed over the gate line.

3. The integrated circuit of claim 1, wherein the first standard cell and the second standard cell are the same as each other in terms of a position of a gate contact formed over the gate line.

4. The integrated circuit of claim 1, wherein an output pin of the first standard cell that outputs an output signal to the outside of the first standard cell is formed as a pattern of a first metal layer formed over the gate line.

5. The integrated circuit of claim 1, wherein an output pin of the first standard cell that outputs an output signal to the outside of the first standard cell is formed as an active contact contacting a source/drain region formed in an active region of the first standard cell.

6. The integrated circuit of claim 5, wherein the first standard cell and the second standard cell are different from each other in terms of a position of a via that is arranged to output the output signal and that is formed over the active contact.

7. The integrated circuit of claim 1, wherein the first standard cell includes a plurality of gate lines through which the input signal is input.

8. An integrated circuit comprising:
   a plurality of standard cells;
   a first metal layer and a second metal layer formed over the first metal layer, the first metal layer and the second metal layer being for interconnecting the plurality of standard cells,
   wherein patterns of the first metal layer extend in a first horizontal direction,
   patterns of the second metal layer extend in a second horizontal direction, and
   at least one standard cell among the plurality of standard cells includes a gate line, which extends in the second horizontal direction and through which an input signal is received, as an input pin.

9. The integrated circuit of claim 8, wherein the at least one standard cell includes a plurality of gate lines through which the input signal is input, as an input pin, and
   the first metal layer includes a routing line that is over the plurality of gate lines and that electrically connects the plurality of gate lines to each other.

10. The integrated circuit of claim 8, wherein, in the at least one standard cell, a no-routing region is defined in which formation of a gate via connecting the gate line and the first metal layer to each other therebetween is prohibited.

11. The integrated circuit of claim 8, wherein the at least one standard cell includes an output pin that is arranged to output an output signal to the outside of the at least one standard cell and that is formed as a pattern of the first metal layer.

12. The integrated circuit of claim 8, wherein the at least one standard cell includes:
   an active region extending in the first horizontal direction; and
   an output pin that is arranged to output an output signal to the outside and that is formed as an active contact contacting a source/drain region formed in the active region.

13. The integrated circuit of claim 8, wherein the at least one standard cell includes an active region extending in the first horizontal direction, and
   a nanosheet that is formed to be surrounded by the gate line is formed in the active region.

14. An integrated circuit comprising:
   a plurality of standard cells; and
   a first metal layer and a second metal layer formed over the first metal layer, the first metal layer and the second metal layer being for interconnecting the plurality of standard cells,
   wherein patterns of the first metal layer extend in a first horizontal direction,
   patterns of the second metal layer extend in a second horizontal direction, and a first standard cell among the plurality of standard cells includes a first gate contact, which contacts a first gate line, which extends in the second horizontal direction and through which an input signal is received, as an input pin.

15. The integrated circuit of claim 14, wherein the first standard cell further includes a second gate line, and a second gate contact that contacts the second gate line and that is formed as an input pin, and
the first metal layer includes a routing line electrically connecting the first gate contact and the second gate contact to each other.

16. The integrated circuit of claim 14, wherein the first standard cell further includes a third gate contact contacting the first gate line, and
the third gate contact includes a dummy contact electrically isolated from the patterns of the first metal layer.

17. The integrated circuit of claim 14, wherein the first standard cell further includes a fourth gate contact contacting the first gate line, and
in the first standard cell, a no-routing region is defined in which formation of a gate via connecting the fourth gate contact and the first metal layer to each other therebetween is prohibited.

18. The integrated circuit of claim 14, wherein the first standard cell includes an output pin that is arranged to output an output signal to the outside of the first standard cell and that is formed as a pattern of the first metal layer.

19. The integrated circuit of claim 14, wherein the first standard cell includes:
an active region extending in the first horizontal direction; and
an output pin that is arranged to output an output signal to the outside of the first standard cell and that is formed as an active contact contacting a source/drain region formed in the active region.

20. The integrated circuit of claim 14, wherein the plurality of standard cells include a second standard cell performing a same function as the first standard cell,
the second standard cell includes a gate line through which an input signal is received and which extends in the second horizontal direction, and a gate contact contacting the gate line, and
the first standard cell and the second standard cell are to the same as each other in terms of an arrangement of internal conductive patterns other than the first gate contact of the first standard cell and the gate contact of the second standard cell.

\* \* \* \* \*